United States Patent
Wallace et al.

(10) Patent No.: US 11,355,025 B2
(45) Date of Patent: Jun. 7, 2022

(54) SIMULATOR FOR SKILL-ORIENTED TRAINING

(71) Applicant: VRSIM, INC., East Hartford, CT (US)

(72) Inventors: Matthew Wallace, South Windsor, CT (US); David Zboray, Trumbull, CT (US); Alejandro Fudge, Manchester, CT (US); Katerine Anderson, Vernon, CT (US); Joshua Armour, Hartford, CT (US); Paul Ong, New Britain, CT (US); Jay Poulin, Manchester, CT (US); Zachary Lenker, Bloomfield, CT (US); Vasily Shishkin, Meriden, CT (US); Sara Blackstock, Manchester, CT (US); Shawn Kennedy, Manchester, CT (US); Claude Manville, Colchester, CT (US)

(73) Assignee: VRSim, Inc., East Hartford, CT (US)

( * ) Notice: Subject to any disclaimer, the term of this patent is extended or adjusted under 35 U.S.C. 154(b) by 264 days.

(21) Appl. No.: 16/646,307

(22) PCT Filed: Sep. 14, 2018

(86) PCT No.: PCT/US2018/051140
§ 371 (c)(1),
(2) Date: Mar. 11, 2020

(87) PCT Pub. No.: WO2019/055821
PCT Pub. Date: Mar. 21, 2019

(65) Prior Publication Data
US 2020/0273365 A1 Aug. 27, 2020

Related U.S. Application Data

(60) Provisional application No. 62/558,623, filed on Sep. 14, 2017.

(51) Int. Cl.
*G06F 3/01* (2006.01)
*G09B 9/00* (2006.01)
(Continued)

(52) U.S. Cl.
CPC ............ *G09B 9/00* (2013.01); *G02B 27/0172* (2013.01); *G06F 3/011* (2013.01); *G06F 3/016* (2013.01);
(Continued)

(58) Field of Classification Search
CPC .......... G09B 9/00; G09B 11/10; G09B 19/24; G09B 19/003; G02B 27/0172; G06F 3/011; G06F 3/016; G06F 3/04817; G06F 3/167
See application file for complete search history.

(56) References Cited

U.S. PATENT DOCUMENTS

| | | | |
|---|---|---|---|
| 2007/0209586 A1* | 9/2007 | Ebensberger | G09B 19/24 118/682 |
| 2016/0026253 A1* | 1/2016 | Bradski | H04N 13/128 345/8 |
| 2016/0267806 A1* | 9/2016 | Hsu | G09B 19/00 |

* cited by examiner

Primary Examiner — Andrey Belousov
(74) Attorney, Agent, or Firm — MKG, LLC

(57) ABSTRACT

The present invention is a simulator for skill-oriented training. The simulator includes a work piece platform having a sensor, a head-mounted display unit (HMDU) including a camera, a speaker and a sensor providing visual and audio output to an operator, and a controller having a controller sensor. The simulator includes a processor that executes algorithms to simulate a virtual training environment depicting a work piece rendered on the work piece platform. The controller sensor, the HMDU sensor and the platform sensor output signals to the processor representing spatial positioning, angular orientation and movement data of the controller relative to the work piece to render a virtual powder coating spray pattern including a stream having particles charged (Continued)

and emitted from the controller and a powder coating coverage as applied to the work piece during one or more passes of a powder coating spray process performed by the operator.

25 Claims, 22 Drawing Sheets

(51) Int. Cl.
*G02B 27/01* (2006.01)
*G06F 3/04817* (2022.01)
*G06F 3/16* (2006.01)
*G09B 11/10* (2006.01)
*G09B 19/24* (2006.01)

(52) U.S. Cl.
CPC .......... *G06F 3/04817* (2013.01); *G06F 3/167* (2013.01); *G09B 11/10* (2013.01); *G09B 19/24* (2013.01)

Stationary Rack

Conveyor

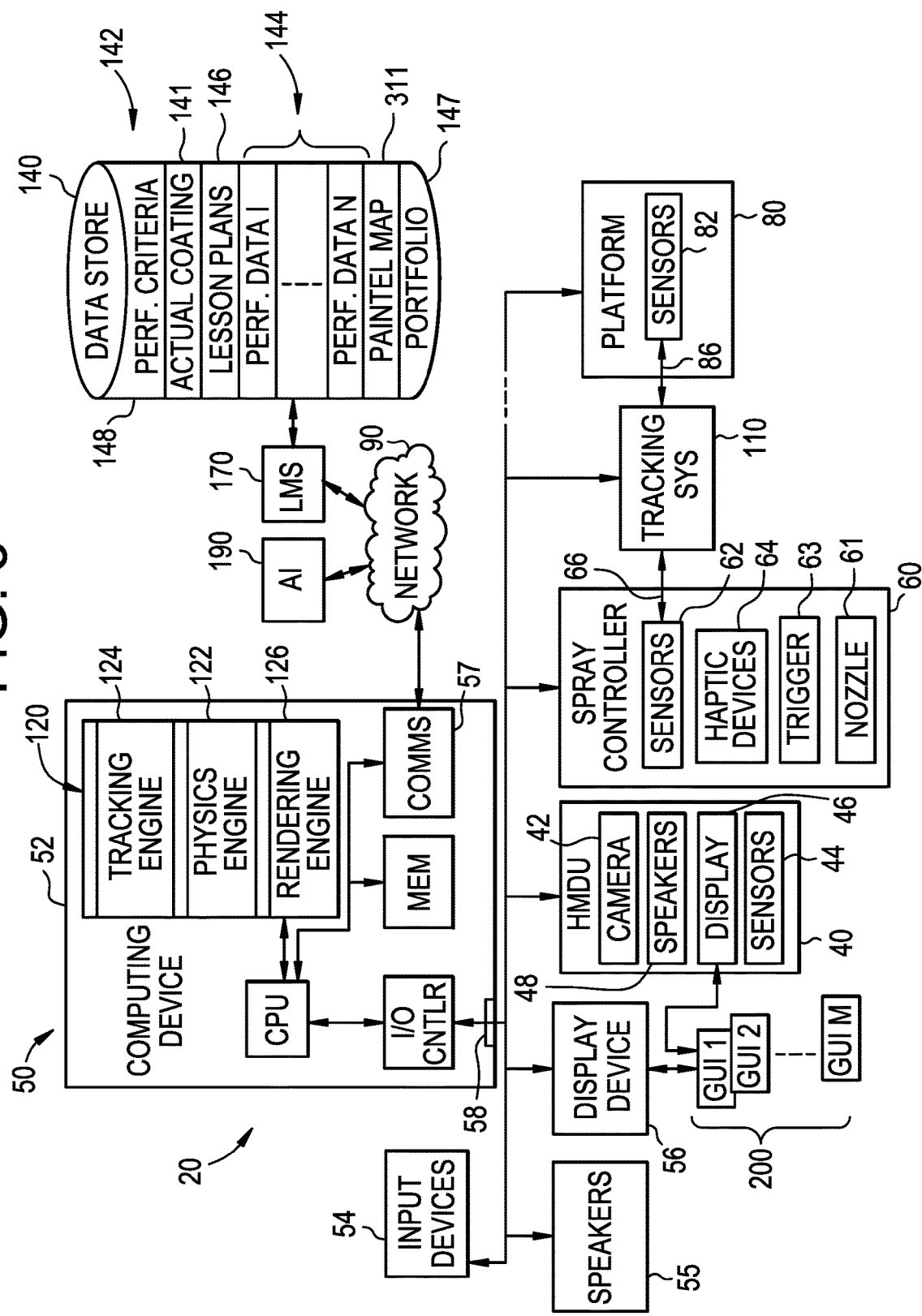

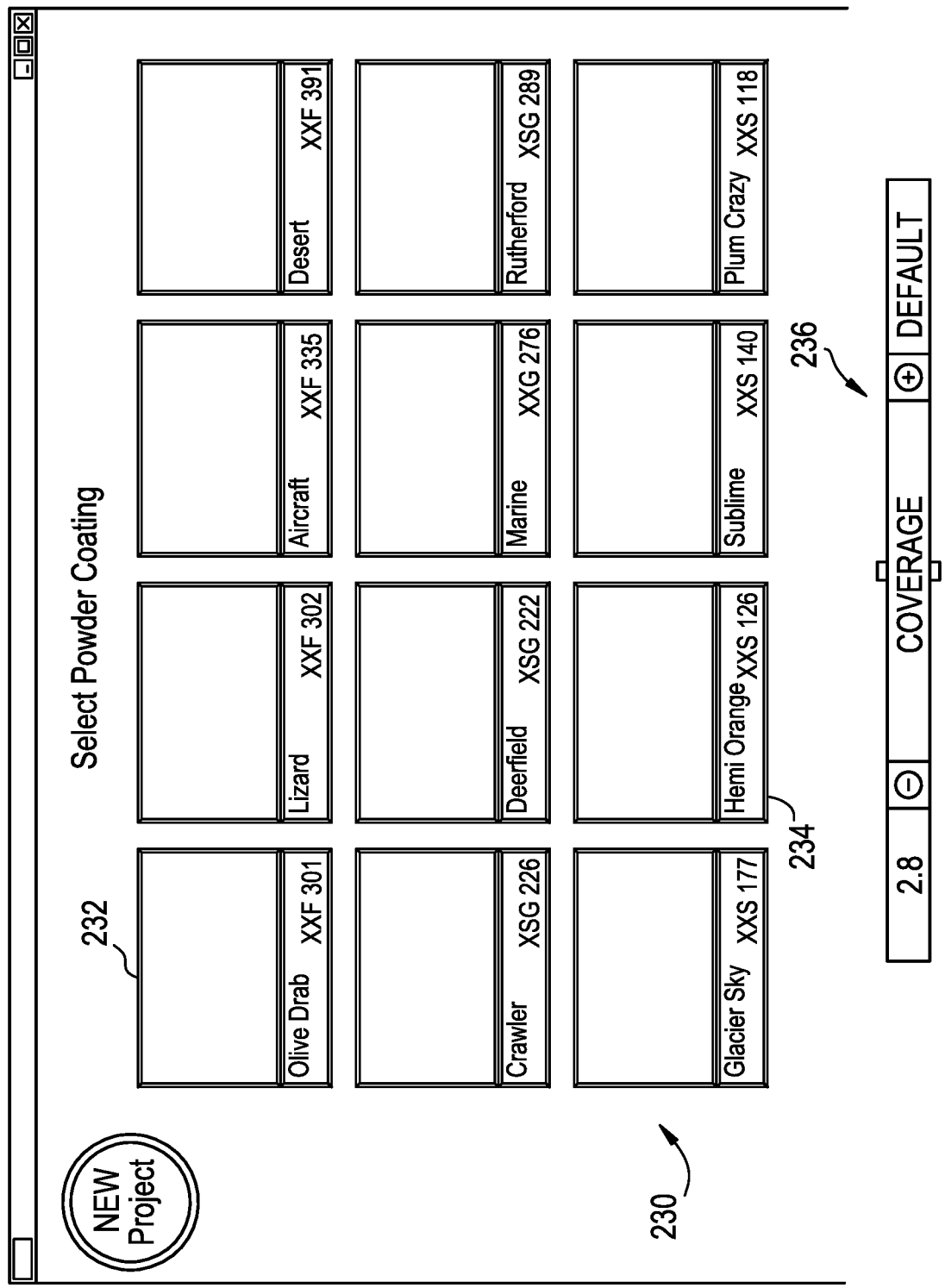

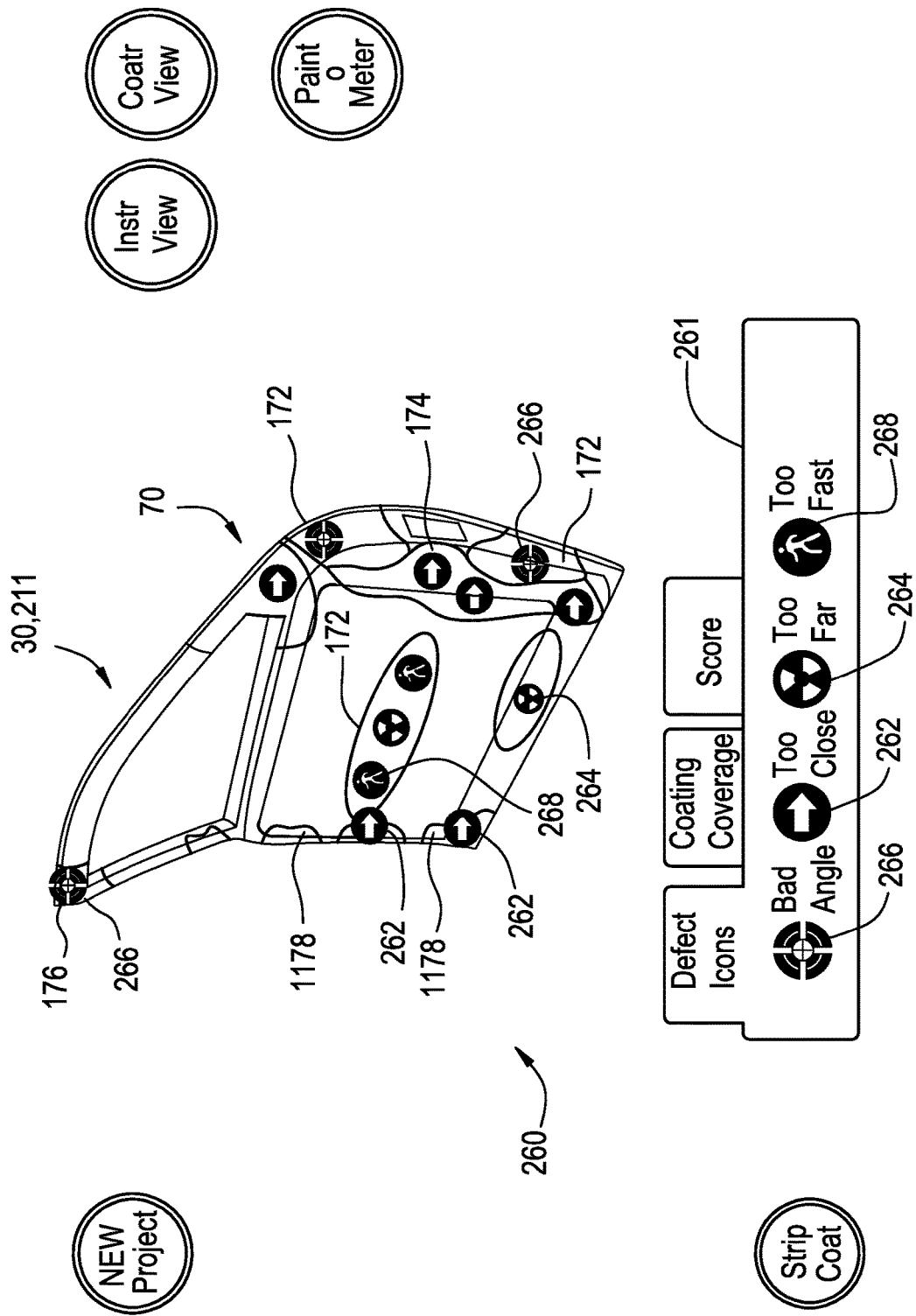

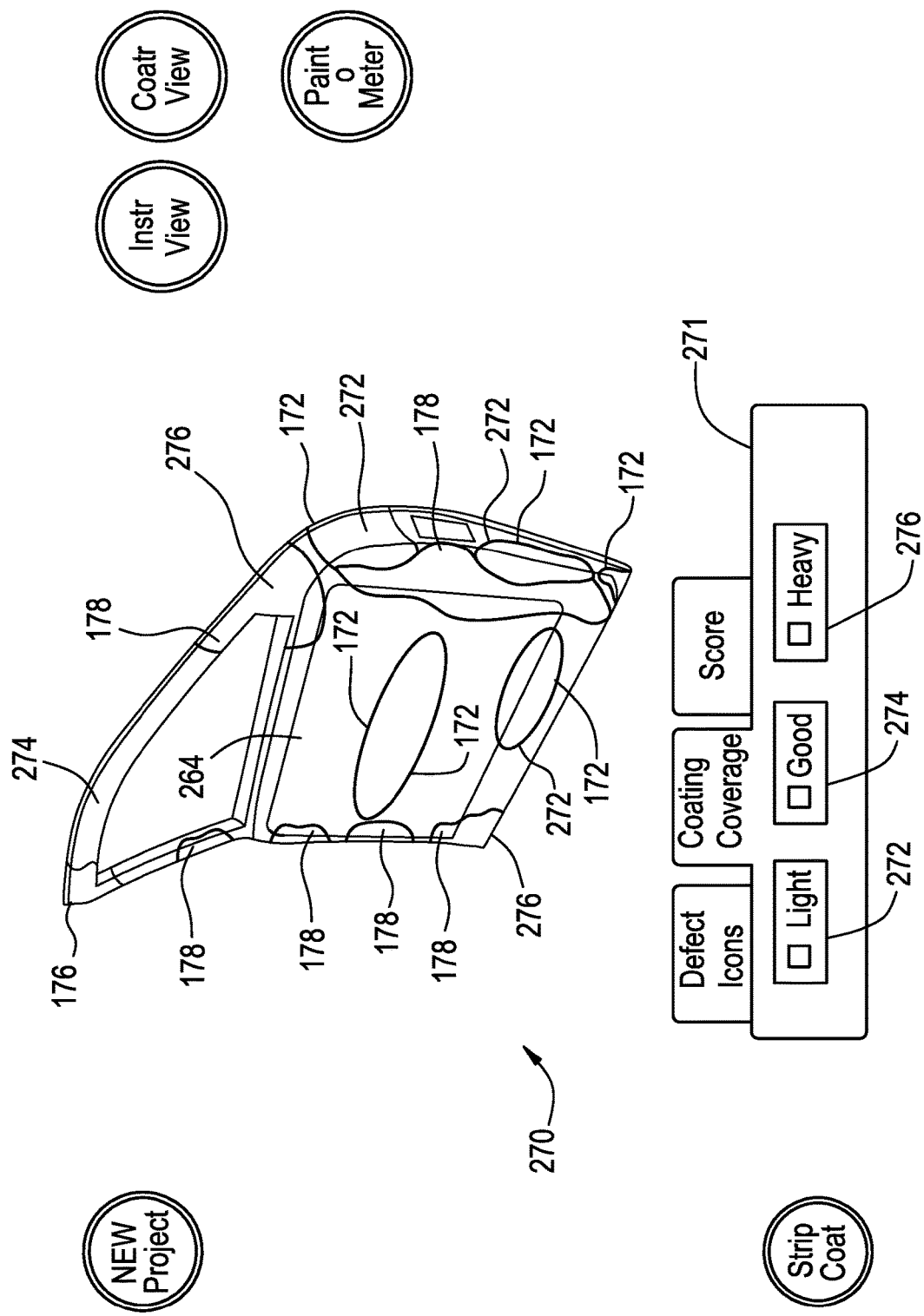

FIG. 12D

| | Total | |
|---|---|---|
| | Simulation Time: | 3:12:56:12 |
| Paintometer | Paint Total Time: | 0:8:33:25 |
| Options | Paint Total Applied: | 3170.3oz |
| Logout | Paint Total Wasted: | 3077.8oz |
| Shutdown | Total Objects Painted: | 213 |
| Sim Spray | VOC Emissions (lbs) | 00.0000 |
| | Abrasive Blast Total Time: | 2:2:3:40 |
| | Sodium Bicarbonate Used: | 0.0 lbs |
| | Garnet Used: | 0.0 lbs |
| | Steel Grit Used: | 0.0 lbs |

| Total | RESET |
|---|---|
| Simulation Time: | 3:12:56:12 |
| Paint Total Time: | 0:8:33:25 |
| Paint Total Applied: | 3170.3oz |
| Paint Total Washed: | 3077.8oz |
| Total Objects Painted: | 213 |
| VOC Emissions (lbs) | 00.0000 |
| Abrasive Blast Total Time: | 2:2:345 |
| Sodium Bicarbonate Used: | 0.0 lbs |
| Garnet Used: | 0.0 lbs |
| Steel Grit Used: | 0.0 lbs |

Admin  COPYRIGHT 2015 VRSIM, INC  Proceed

292

SIMULATOR FOR SKILL-ORIENTED TRAINING

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office files or records, but otherwise reserves all copyright rights whatsoever.

BACKGROUND OF THE INVENTION

1. Technical Field

The present invention relates generally to a training system employing computer simulation and immersive virtual reality for instructing and evaluating the progress of a person performing a skilled-oriented task and, more particularly, to a simulator for instructing and evaluating performance of a skilled-oriented task of a process such as, for example, a component processing and/or assembly process performed by a tradesman.

2. Related Art

Generally speaking, training is needed for a person to acquire and/or maintain skills necessary for performing a skill-oriented task such as, for example, constructing, assembling and/or finishing one or more components. For example, when performing a coating or spraying step, an operator must operate a spray coating system at an optimum distance and orientation from a subject surface to be painted or coated so that a coating is applied at a proper finish coat thickness on the surface. If, for example, a nozzle of the spray coating system is placed too close to the subject surface, an uneven wet film build-up may result and/or the coating may run or drip. Alternatively, if the nozzle is placed too far from the subject surface, over spraying or ineffective coverage results such that repeated passes are required to achieve the desired finish coat thickness. Repetition of good practices and correction of less than optimal practices are needed to ensure personnel acquire and/or maintain the necessary skills. However, repetition is time consuming and costly as raw materials (e.g., surfaces to be coated, coatings and preparation materials, etc.) are expensive. Moreover, some coatings raise environmental concerns during use and/or disposal, which again can negatively impact training costs. Accordingly, training time and costs need to be optimized.

There have been efforts to simulate skill-oriented tasks such as spray coating operations to improve training and minimize costs. Some efforts have included the use of computer simulation and virtual reality; see, for example, U.S. Pat. Nos. 7,839,416 and 7,839,417, both issued on Nov. 23, 2010, and assigned at issuance to University of Northern Iowa Research Foundation (Cedar Falls, Iowa USA). However, these conventional systems are seen to be too expensive and/or lack the accuracy and "look and feel" of real-life task and, spray coating operations in particular. As such, conventional simulation systems are of limited use within, and of limited benefit to the industry. An improvement of such conventional systems includes a system disclosed in U.S. Pat. No. 9,384,675, assigned to Applicant of the present application, VRSim, Inc. (East Hartford, Conn. USA).

Generally speaking the aforementioned conventional systems are directed to simulating spray coating of liquid paint. The inventors have recognized that the need for repetition of good practices and correction of less than optimal practices to ensure personnel acquire and/or maintain the necessary skills also applies to spray operations using powder coatings. In powder coating applications a dry powder is typically applied electrostatically such that charged particles of paint, for example, powdered particles or atomized liquid, are sprayed toward a conductive work piece that is electrically charged or grounded to attract the charged particles. Once coated, the work piece is heated to allow the coating to flow, form a "skin" over the work piece and cure to create, preferably, a hard, smooth finish. Less than optimal application can result in defects in the finish including for example, a bumpy surface of peaks and valleys, generally referred to as "orange peel" texture.

Accordingly, there is a need for improved training systems and method using computer simulation and immersive virtual reality and which permit evaluation of the progress of a person applying a powder coating using a spray coating system.

SUMMARY OF THE INVENTION

The present invention is directed to a simulator for skill-oriented training of a task. The simulator includes a work piece platform having at least one platform sensor and a three-dimensional immersive virtual training environment depicting a work piece rendered on the work piece platform. The simulator also includes a head-mounted display unit (HMDU) worn by an operator operating the simulator. The HMDU includes at least one camera, at least one speaker and at least one HMDU sensor. The camera and the speaker provide visual and audio output to the operator thus depicting the training environment. The simulator also includes a controller. The controller includes at least one controller sensor. The controller sensor, the HMDU sensor and the platform sensor cooperate to output one or more signals representing spatial positioning, angular orientation and movement data of the controller relative to the work piece rendered on the work piece platform. The simulator includes a data processing system coupled to the work piece platform, the HMDU, and the controller. The data processing system receives the one or more signals and executes a plurality of algorithms for rendering in real-time the work piece, a virtual powder coating spray pattern including a powder coating stream having particles emitted from the controller and a powder coating coverage. The powder coating coverage depicts the virtual powder coating spray pattern as applied to the work piece during one or more passes of a powder coating spray process. The data processing system further renders sensory guidance as to performance to at least the operator in the training environment.

In one embodiment, the algorithms executed by the data processing system include a tracking engine, a physics engine and a rendering engine. The tracking engine receives the one or more signals from the controller sensor, the HMDU sensor and the platform sensor, and determines coordinates of a next position, a next orientation, and a speed of movement of the controller in relation to the work piece rendered on the work piece platform from a previous position and a previous orientation to the next position and the next orientation of the one or more passes of the powder coating spray process. The physics engine models the powder coating spray process and determines the powder coating stream, the particles and the applied powder coating coverage from the coordinates determined by the tracking engine. The rendering engine receives the modeled powder coating spray pattern and, in response thereto, renders the virtual powder coating spray pattern including the powder coating stream, the particles and the powder coating coverage in the training environment. The simulator operates such that the virtual powder coating spray pattern including the powder coating stream, the particles and the powder coating coverage, and the sensory guidance are exhibited in near real-time to the operator within the training environment to provide in-process correction and reinforcement of preferred performance characteristics as the operator operates the controller.

In one embodiment, the sensory guidance exhibited to the operator and/or others includes one or more of visual, audio and tactile indications of performance by the operator operating the controller relative to the work piece rendered on the work piece platform as compared to optimal values for each position and orientation within the one or more passes of the powder coating spray process. In one embodiment, the position and orientation components including a speed and direction of the coating pass and proximity of the controller relative to the work piece and the work piece platform.

In one embodiment the visual indications of performance include an indication of when the controller is operated at least one of too close in position to the work piece, at an optimal position to the work piece, and too far in position from the work piece.

In one embodiment, the applied powder coating coverage is depicted to include a plurality of coverage regions and the visual indications include one or more icons highlighting one or more of the plurality of coverage regions having less than optimal characteristics.

In one embodiment, the visual indications of performance include a plurality of lines, presented within the three-dimensional virtual training environment, the plurality of lines visually presenting paths of the controller during the one or more passes of the powder coating spray process. In yet another embodiment, the plurality of lines are presented in a layered effect representing successive applications of the virtual powder coating to the work piece such that a first line representing a first path is over layered by a second line representing a second path. In still another embodiment, the plurality of lines include one or more visual cues illustrating the controller's speed, direction and orientation along the path.

In one embodiment, the data processing system further includes a display device operatively coupled to the data processing system such that an instructor may monitor the performance of the operator of the controller.

In one embodiment, the controller further includes one or more haptic devices that impart at least one of forces, vibrations and motion to the operator of the controller. In yet another embodiment, the forces, vibrations and motions from the haptic devices simulate the emission of the virtual powder coating spray.

In one embodiment, the visual indications include a score of the operator in equipment settings and controller movement including speed, direction or path, orientation, and distance, as compared to a set of performance criteria to standards of acceptability. In yet another embodiment, the score is a numeric score based on how close to optimum the operator's performance is to the set of performance criteria. In another embodiment, the score further includes rewards including certification levels and achievement badges highlighting the operator's results as compared to the set of performance criteria and to other operators. In still another embodiment, the score and rewards for one or more operators are at least one of shared electronically, posted on a website or bulletin board, and over social media sites.

BRIEF DESCRIPTION OF THE DRAWINGS

Referring now to the Figures, which are exemplary embodiments, and wherein the like elements are numbered alike.

FIG. 5 is a simplified block diagram of components of the powder coating simulator of FIG. 1, according to one embodiment of the present invention.

FIG. 7 is a graphical user interface depicting options for set-up parameters for application of a coating with the coating simulator of FIG. 1, according to one embodiment of the present invention.

FIGS. 10 and 11 are graphical user interfaces depicting a performance, evaluation and instructional view for an application of a coating with the coating simulator of FIG. 1, according to one embodiment of the present invention.

FIGS. 12A to 12D are graphical user interfaces depicting a performance, evaluation and instructional view for an application of a coating with the coating simulator of FIG. 1 including a POWDEROMETER™ summary view, according to one embodiment of the present invention.

DESCRIPTION OF PREFERRED
EMBODIMENTS OF THE INVENTION

Figure 1:
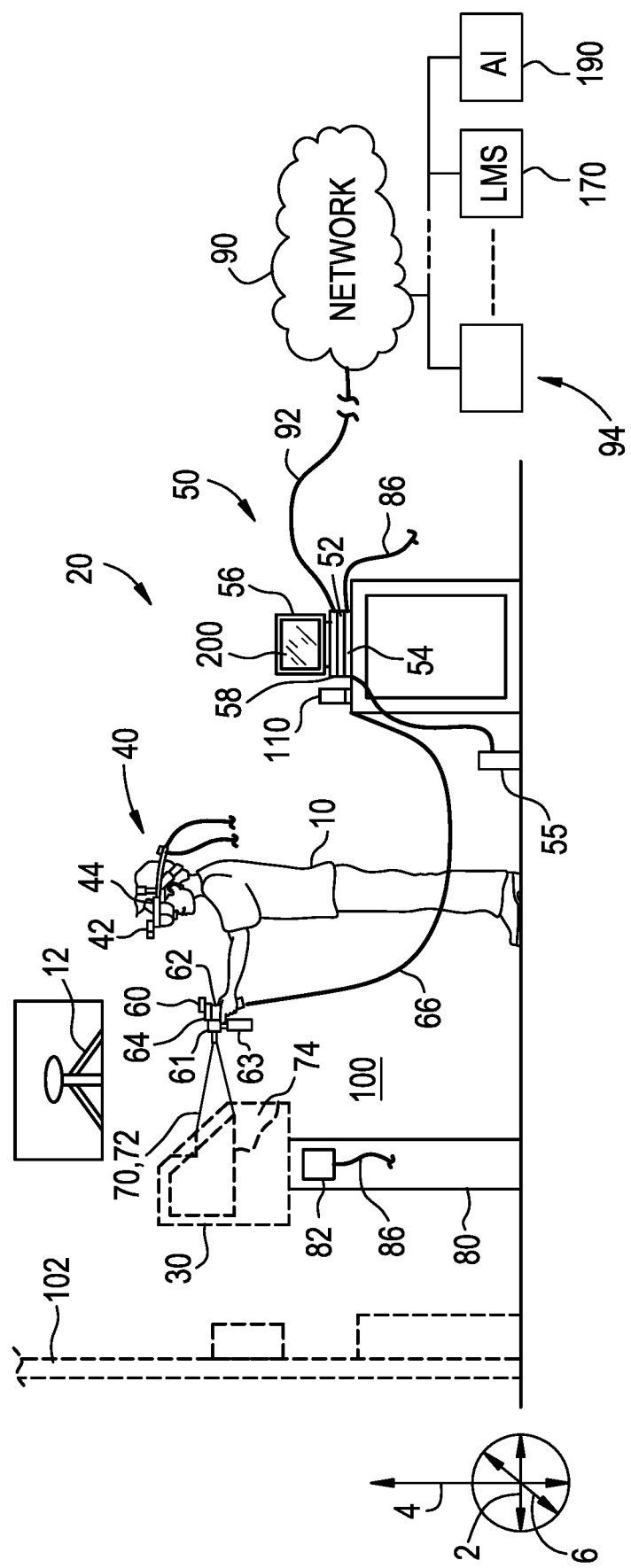
FIG. 1 is a schematic diagram of a powder coating simulator defining and operating within a three-dimensional spray powder coating environment, according to one embodiment of the present invention.

FIG. 1 depicts an operator 10 operating a simulator 20 for training, for example, to develop and/or improve his/her skills in performing a skill-oriented task or step within a process. The simulator 20 provides an evaluation of the skills demonstrated by the operator 10 in performing the skill-oriented task or step. The operator's skills include, for example, proper technique in performing the task, namely, his/her positioning and movement of a tool to consistently perform the task in a preferred manner. As described herein, the simulator 20 provides evaluation in real-time, e.g., as the task or step is being performed, and after one or more performances, e.g., in one or more review modes.

In one embodiment, the simulator 20 is a powder coating simulator for training and evaluating the operator's performance of a task, namely, using a controller 60 (e.g., a powder coating spray controller) to apply one or more virtual powder coatings 70 to a virtual work piece 30. A tracking system spatial senses and tracks movement of the powder coating spray controller 60 (e.g., speed, direction or path, orientation, and the like) by the operator 10 in one or more applications of the powder coating 70 to the work piece 30. The powder coating simulator 20 collects, determines and/or stores data and information (described below) defining the movement of the powder coating spray controller 60 including its speed, direction or path, orientation, and the like, as well as the impact of such movement on the powder coating 70 in the one or more virtual applications of the powder coating 70 (e.g., passes applying the powder coating 70) to the work piece 30.

As illustrated in FIGS. 1, 2A to 2E, the powder coating spray simulator 20 simulates, in virtual reality, the powder coating 70 including a virtual powder coating stream 72 "charged" within the powder coating spray controller 60 and emitted from a nozzle 61 of the controller 60 in response to activation or depression of a trigger 63 of the controller 60 by the operator 10. The simulator 20 also simulates, in virtual reality, a powder coating coverage 74 as the charged powder coating stream 72 is applied to and/or deposited on an electrostatically charged or grounded work piece 30. The powder coating stream 72 is rendered to include particles 76 of varying size, shape, color including both coating color and a "wet look" effect (e.g., reflectivity and gloss), and the like, as the powder coating stream 72 is emitted in real-time from the powder coating spray controller 60 and attracted toward the work piece 30. As rendered, the particles 76 each travel or "fly" based on the position and orientation of the controller 60 when emitted therefrom, as well as the simulated environment conditions (e.g., air flow, strength and position of the electrostatic field and resistance and/or one or more zones thereof, etc., "air effects" described below). In one embodiment, each of the particles 76 is rendered to include a unique path of travel or flight from emission from the controller 60 to collision with the work piece 30. The inventors have recognized that such specific particle-based modeling and rendering provides a more genuine, "natural" look to the simulation and the resulting powder coating application process. In one embodiment, interaction between each particle (or one or more selected individual particles, or a selected group of particles is modeled or calculated to simulate how particles break up or otherwise behave due to collision with the work piece and/or due to the influence of the electrostatic field.

The powder coating coverage 74 is rendered to include a depth, viscosity, angular sheen, texture and like characteristics, as the powder coating stream 72 is applied to and/or deposited on, in real-time, the work piece 30. It should be appreciated that the orientation of the work piece 30 may influence the powder coating coverage 74 as gravity and accumulation may generate runs or drips prior to curing of the powder coating 70.

The movement of the powder coating spray controller 60 and the characteristics of the powder coating 70 as emitted from the controller 60 and as attracted to the work piece 30 as the powder coating stream 72, and as the powder coating 70 is applied to the work piece 30 as the powder coating coverage 74, are evaluated in-process and after application. For example, the characteristics of the powder coating stream 72 and powder coating coverage 74, and importantly, the acceptability thereof, reflect the technique and/or level of skill of the operator 10 in performing the powder coating spray operation. As can be appreciated, good technique typically results in an acceptable coating, and less than good technique may result in an unacceptable coating of the work piece 30. The evaluation, and various review modes thereof (described below), allows the operator 10, an instructor and/or others (e.g., other trainees) to evaluate the technique used in applying the virtual powder coating stream 72, the applied powder coating coverage 74, and to make in-process adjustments to or maintain the technique being performed and/or performed in a next application. The evaluation compares the demonstrated technique to acceptable performance criteria for the task and ultimately the acceptability of the finish applied by the operator 10 to the work piece 30. In one embodiment, the review modes may be utilized to evaluate an operator's knowledge of acceptable and/or unacceptable aspects of a previous performance by the operator or by an actual or theoretical third party operator. For example, a review mode may present a number of deficiencies in a performance and query the operator to identify the type or nature of the deficiency, possible reasons for the deficiency and/or how to correct the deficiency going forward or in remedial operations.

It should be appreciated that it is also within the scope of the present invention for the review modes to provide tutorials, e.g., audio-video examples, illustrating setup and use of tools and equipment typically used in the industry, acceptable performance techniques using the same, common deficiencies and ways to reduce or eliminate the same, and the like. It should also be appreciated that, as described herein, the powder coating spray simulator 20 can be used for training, developing and improving other skills (e.g., more than just applying a powder coating) required in skill-oriented tasks performed by tradesman such as, for example, work place safety, team building and group performance skills, and the like. It should further be appreciated that the powder coating spray simulator 20 may be implemented as a project based system wherein an individual instructor, certification agent, or the like, may define their own performance characteristics (e.g., elapsed time, desired powder coating thickness, and the like) and/or criteria including those unique to the instructor, agent and a given powder coating or application, and/or which incorporate industry performance criteria, standards and/or inspection protocols. In such embodiments, the operator 10 is evaluated in accordance with the unique performance characteristics and/or criteria. In one embodiment, as described below, the powder coating spray simulator 20 is operatively coupled to a Learning Management System (LMS) 170. The LMS 170 includes a data store (DB) 140 that stores data and information 142 used by the powder coating spray simulator 20.

Figure 3A:
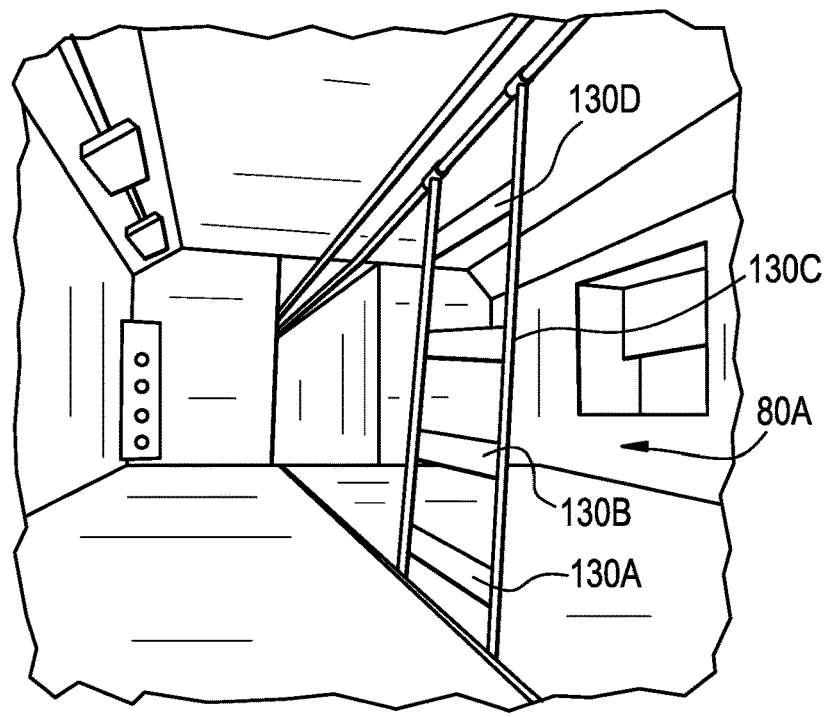
FIGS. 3A and 3B depict examples of 3-D powder coating spray environments of interest including a stationary rack and conveyor assembly line, respectively, in accordance with embodiments of the present invention.
Figure 3B:
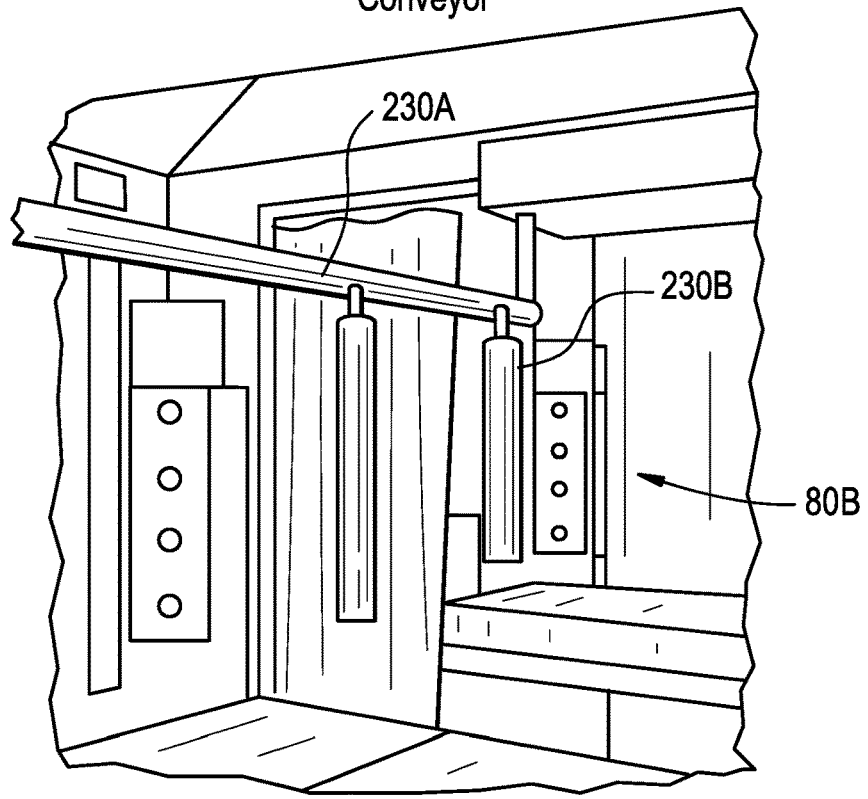

As shown in FIG. 1, the powder coating spray simulator 20 employs immersive virtual reality to create a three-dimensional (3-D) powder coating spray environment 100. The 3-D powder coating spray environment 100 presents near real-time 3-D virtual imagery of the work piece 30 aligned with the operator 10 and the powder coating spray simulator 20 as the powder coating 70 is being applied to the work piece 30. As described below, the 3-D powder coating spray environment 100 depicts an area of interest 102 such as, for example, a spray booth, production or manufacturing shop floor, and the like, to provide the operator 10 with a "look-and-feel" of performing the powder coating task under real-life working conditions. As shown in FIG. 1, the work piece 30 is rendered upon a work piece platform 80 within the powder coating spray environment 100. In one embodiment, the platform 80 may be adjustable in a plurality of positions, for example, within any of three (3) directions including over a x-axis 2 defined in a horizontal plane toward and/or away from the operator 10, a y-axis 4 defined by a vertical plane, and a z-axis 6 defined by a plane projecting to a right-hand side of the operator 10 (e.g., inwardly on FIG. 1) and a left-hand side of the operator 10 (e.g., outwardly from FIG. 1). In one embodiment, the 3-D powder coating spray environment 100, work piece 30 and work piece platform 80 are implemented to simulate a stationary rack 80A (FIG. 3A) such that one or more work pieces 130A to 130D are placed on the rack for spray application of the virtual powder coating 70. In another embodiment, the 3-D powder coating spray environment 100, work piece 30 and work piece platform 80 are implemented to simulate a conveyor assembly line 80B (FIG. 3B) such that one or more work pieces 230A and 230B pass by the operator 10 at a predetermined, or operator determined, speed for spray application of the powder coating on the work pieces 230A and 230B as they pass.

In one aspect of the present invention, the inventors have discovered that an accurate simulation of the characteristics of a powder coating spray application accounts for the actions and reaction of component parts of the powder coating 70, namely, the charged powder coating particles 76 and their characteristics within the powder coating stream 72 and the powder coating coverage 74. A conventional powder coating spray gun emits a charged particle-gas mixture from its nozzle including the powder coating (e.g., particles of paint, stain, epoxy and other coatings) and compressed air or other gas. In accordance with the present invention, the simulator 20 renders the powder coating stream 72 as a mixture or spray cloud of charged particles 76 emitted from the nozzle 61 of the controller 60. Accordingly, and as shown in FIGS. 2A-2E, the powder coating spray simulator 20 as described herein implements the virtual powder coating 70 as the charged particles 76 within the powder coating stream 72 comprising a spray cone 71 and a spray cloud 73. The spray cone 71, including the charged particles 76, is emitted from the nozzle 61 of the controller 60, is attracted to the electrostatically charged or grounded work piece 30 and collides with, adheres to and/or accumulates on a surface 32 of the work piece 30 as the powder coating coverage 74. The spray cloud 73 includes the particles 76 from the spray cone 71 that, due to, for example, over spraying, curves or "wraps" around the surface 32 intended to be coated and adheres to one or more opposing surfaces 34 of the work piece 30 (FIG. 2A). In one embodiment, the size and/or shape of the spray cloud 73 is a visual indication of poor transfer efficiency of the powder coating 70 to the work piece 30 and its accurate simulation, along with accumulation of particles 76 on (e.g., powder coating coverage 74) the work piece 30, can assist in the correction of in-process technique and thus is a valuable training aid. As shown in FIGS. 2A-2E, characteristics of the spray cone 71 and the spray cloud 73 vary within the powder coating spray simulator 20 depending on, for example, the proximity or distance between the powder coating spray controller 60 emitting the powder coating stream 72 from the nozzle 61 of the controller 60 and the work piece 30 (FIGS. 2A being "to close" and 2B being "to far away"), the shape and/or size of the work piece 30 (FIGS. 2C and 2D), the orientation or angle of the controller 60 relative to the work piece 30 (FIG. 2E) and other characteristics of the spray powder coating operation (e.g., direction and/or speed of a coating pass), condition of the work piece 30 (e.g., whether it is dry or wet, overlap, etc.) and/or environmental conditions such as, for example, rendered/simulated environmental effects such as temperature, wind, moisture and the like. In one embodiment, the powder coating simulator 20 includes a mode, namely a Faraday Mode, that simulates spray coating work pieces having surfaces that may complicate traditional electrostatic coating operations. For example, electrostatically coating a work piece 30 (FIG. 2D) having a recessed area shown generally at 36 may result in, what is referred to in the industry as a "Faraday Cage Effect," such that when coating recessed areas, the charged particles 76 are drawn to edges 36B of the recessed area 36 as opposed to a center 36A of the recessed area 36.

Moreover, the powder coating simulator 20 simulates characteristics of the spray cone 71 and the spray cloud 73 in what are referred to as "air" effects, as well as "applied" or "on" effects, to provide an even more realistic rendering of the virtual powder coating 70. As should be appreciated, the air effects include characteristics of the charged powder coating particles 76 as they each travel through simulated air and are attracted to the electrostatically charged or grounded work piece 30 such as, for example, size, shape, color, texture, and the like, as charged coating particles 76 move at varying speeds influenced by, for example, pressure settings, trigger position (e.g., force at which the trigger is depressed) of the controller 60, influence the electrostatic charge, field and/or electrostatic zones may have on each individual particles, and the like. The applied or on effects include characteristics of the charged powder coating particles 76 as they contact the work piece 30 to form the powder coating coverage 74 such as, for example, color (e.g., coating color and wet look), shape, depth, viscosity, angular sheen, texture, overlap, and defects in coverage (e.g., crackling, runs, sags, drips, orange peel texture, "fish eye" texture, etc.) and the like.

As should be appreciated, it is within the scope of the present invention to monitor a time period for one or more of these characteristics such that as the charged powder coating particles 76 remain on the work piece 30 for a predetermined duration of time characteristics such as, for example, the wet look (reflectivity and/or gloss), the simulator 20 may gradually change the powder coating coverage 74, and particles 76 therein, to simulate drying, curing and/or fading over time. Similarly, when applying a coating for a second and/or subsequent pass, a "wet" work piece 30 influences how new particles 76 are applied and/or are retained on (e.g., accumulate on) the work piece 30. For example, in one embodiment, the coating simulator 20 accounts for such characteristics by clustering or merging one or more wet particles within a predetermined distance from each other to influence the wet look or formation of drips and/or runs on the work piece 30 due to excessive accumulation and build-up. Aspects of the simulation of such defects are described in further detail below.

As is generally known, once a work piece is powder coated, it is heated to allow the particles to melt, and the powder coating to flow and then cure to form, preferably, a hard, smooth finish. Accordingly, the coating simulator 20 simulates such post-heated, so-called "post-bake," characteristics of the powder coated work piece 30. Often, many defects in the spray powder coating and an operator's particular application thereof, are not visually apparent until after curing. Thus, the review modes of the coating simulator 20 selectively include both a "post-bake," cured view of the work piece 30 and a "wet" view of the work piece 30.

Figure 4:
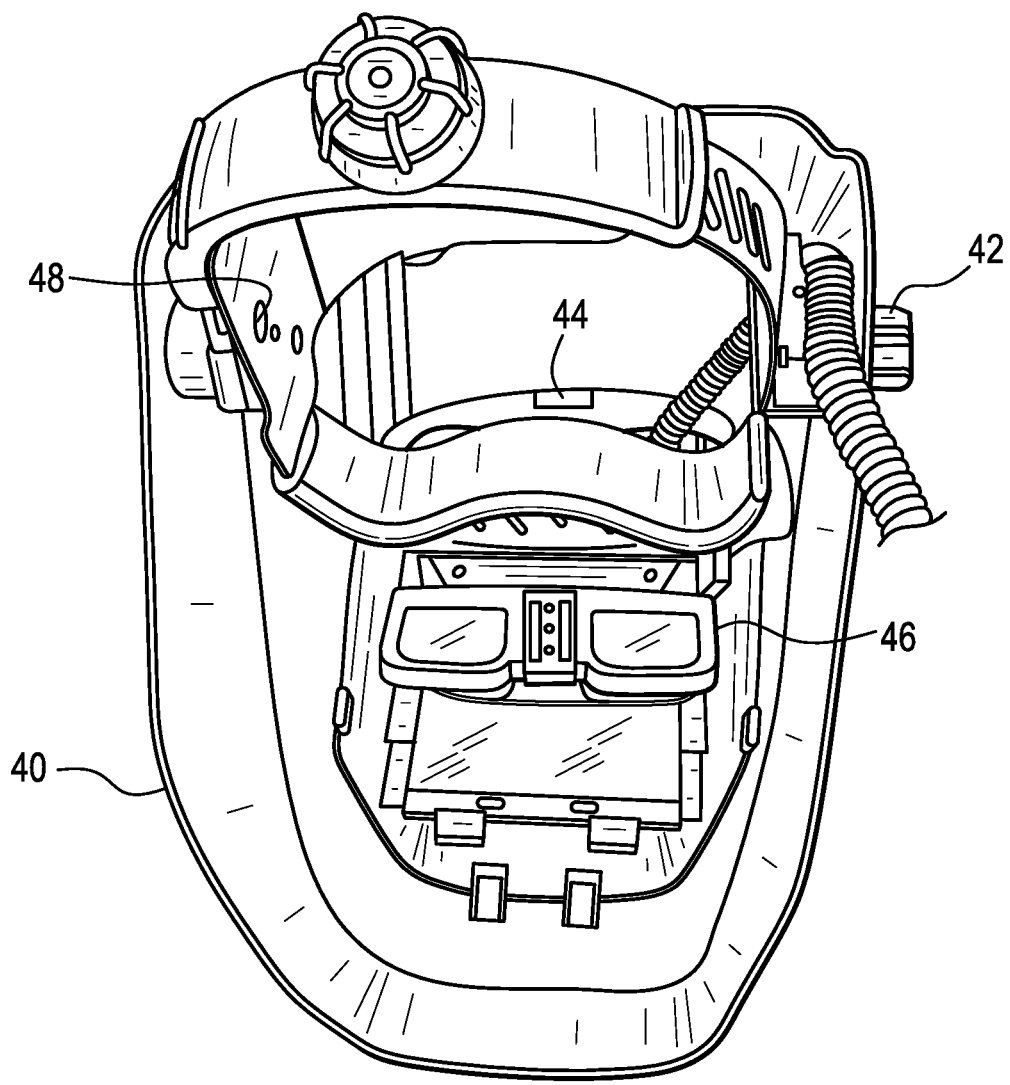
FIG. 4 depicts a head-mounted display unit utilized in the coating simulator of FIG. 1, according to one embodiment of the present invention.

Referring to FIGS. 1 and 4, one or more video cameras 42 and other sensors 44 provided on, for example, a head-mounted display unit (HMDU) 40 worn by the operator 10, provide data to a processing system 50 which reconstructs a position and orientation of the HMDU 40 and the powder coating spray controller 60 in relation to the platform 80 and the work piece 30 in the powder coating environment 100. As the controller 60 is operated by the operator 10, the processing system 50 generates virtual imagery of the controller 60 applying the virtual powder coating 70 to the work piece 30. The operator 10 interacts within the virtual reality provided in the 3-D powder coating spray environment 100, for example, to view and otherwise sense (e.g., see, feel and hear) the work piece 30, the controller 60 and the powder coating 70 as it is being applied. The interaction is monitored and data therefrom is recorded to permit performance evaluation by the operator 10, an instructor or certification agent 12 and/or other operators/trainees present during training or otherwise monitoring the interaction within the powder coating spray environment 100 at or from another location remote from where the training is being conducted, as is described in further detail below.

In one embodiment, the powder coating simulator 20 generates audio, visual and other forms of sensory output, for example, vibration, air flow, workplace disturbance (e.g., wind, noise, etc.), environmental conditions (e.g., lighting) and the like, to simulate senses experienced by the operator 10 as if the operation is being performed in a real world setting. For example, the powder coating simulator 20 simulates experiences that the operator 10 may encounter when performing the powder coating task "in the field," e.g., outside of the training environment and in a work environment. As shown in FIG. 4, the HMDU 40 includes a display device 46 and audio speakers 48 that provide images and sounds generated by the powder coating simulator 20 to the operator 10. In keeping with the goal of accurately simulating real world settings and work experiences within the 3-D powder coating spray environment 100, the powder coating spray controller 60 of the powder coating simulator 20 emulates characteristics of an actual powder coating spray gun and the sound and feel (e.g., weight, vibration and the like) of operating the same. For example, the powder coating spray controller 60 is similar in configuration as, for example, a conventional electrostatic powder coating spray gun or applicator, and the like models available for purchase by those in the industry, including being substantially the same in terms of shape, weight and operating features and functions. In one embodiment, the simulated powder coating 70 may comprise a dry or wet powder including particles of, for example, a paint, stain, epoxy and like coatings. Input and output devices of the HMDU 40 and the powder coating spray controller 60 such as, for example, the cameras 42, the sensors 44, the display 46, and the speakers 48 of the HMDU 40, and sensors 62 and haptic devices 64 of the controller 60 (e.g., rumble packs to simulate pressure from the mixture (e.g., powder coating and air/gas) emitted from the controller) that impart forces, vibrations and/or motion to the operator 10 of the controller 60, and external input and output devices such as speakers 55, are incorporated into the conventional form factors. Moreover, control knobs, buttons and the like, that are used to set coating parameters of the powder spray gun, compressor and like peripheral equipment, are simulated on the powder coating spray controller 60 and/or the data processing system 50. Signals from these input and output devices (as described below) are input signals and provide data to the processing system 50. The data is processed and provided to permit a thorough evaluation of the simulated powder coating procedure including the settings of equipment used therein.

As should be appreciated, the HMDU 40, the powder coating spray controller 60 and the work piece platform 80 provide a plurality of inputs to the powder coating simulator 20. The plurality of inputs includes, for example, spatial positioning (e.g., proximity or distance), orientation (e.g., angular relationship) and movement (e.g., direction and/or speed) data and information for tracking the position of the powder coating spray controller 60 relative to the work piece 30 and/or work piece platform 80 within the 3-D powder coating spray environment 100. The HMDU 40, the powder coating spray controller 60 and/or the work piece platform 80 may include sensors that track the movement of the operator 10 operating the controller 60. In one embodiment, sensors 62 and 82 such as, for example, magnetic sensors, are mounted to and/or within the spray controller 60 and the work piece platform 80 for measuring spatial position, angular orientation and movement within the 3-D powder coating spray environment 100. In one embodiment, the sensors 62 and 82 of the controller 60 and the platform 80 are components of a six degree of freedom (e.g., x, y, z for linear direction, and pitch, yaw, and roll for angular direction) tracking system 110 such as, for example, is available as a Polhemus PATRIOT™Tracking System, model number 4A0520-01, from the Polhemus company (Colchester, Vt. USA) operatively coupled to the processing system 50. It should be appreciated that it is within the scope of the present invention to employ other tracking systems for locating the controller 60 in relation to the platform 80 and the work piece 30. For example, in some embodiments the coating simulator 20 includes a capability to automatically sense dynamic spatial properties (e.g., positions, orientations, and movements) of the spray controller 60 during a virtual coating process that produces a virtual coating. The coating simulator 20 further includes the capability to automatically track the sensed dynamic spatial properties of the spray controller 60 over time and automatically capture (e.g., electronically capture) the tracked dynamic spatial properties of the spray controller 60 during the virtual coating process.

As shown in FIG. 1, the sensors 62 and 82 output data that is received by the tracking system 110 over communication connections 66 and 86 (e.g., provide input) and provided to the processing device 50 for use in determining the operator's 10 and the spray controller's 60 movement within the 3-D powder coating spray environment 100, e.g., in relation to the work piece 30 and platform 80. While shown as wired communication connections, it should be appreciated that the communication connections 66 and 86 may be or may include wireless communication connections.

In one embodiment, as illustrated in FIG. 5, a simplified block diagram view of the powder coating simulator 20, the processing system 50 is a standalone or networked computing device 52 having or coupled to one or more microprocessors (CPU), memory (e.g., ROM, RAM), and/or data storage devices 140 (e.g., hard drives, optical storage devices, and the like) as is known in the art. The computing device 52 includes one or more input devices 54 such as, for example, a keyboard, mouse or like pointing device, touch screen portions of a display device, ports 58 for receiving data such as, for example, a plug or terminal receiving the wired communication connections 66 and 86 from the sensors 62 and 82 directly or from the tracking system 110, and one or more output devices 46, 56 such as, for example, one or more display devices operative coupled to the computing device 52 such as a monitor coupled directly to the computing device or portable device such as a personal digital assistant (PDA), IPAD or the like. In one embodiment, output devices 46 and 56 exhibit one or more graphical user interfaces 200 (as described below) that may be viewed by the operator 10 operating the coating simulator 20, the instructor or certification agent 12, and/or other interested persons such as, for example, other trainees, observing and evaluating the operator's 10 performance. In one embodiment, illustrated in FIGS. 1 and 5, the processing system 50 includes network communication circuitry (COMMS) 57 for operatively coupling the processing system 50 by wired or wireless communication connections 92 to a network 90 such as, for example, an intranet, extranet or the Internet, and to other processing systems, display devices and/or data storage devices 94. In one embodiment, described in detail below, the communication connection 92 and the network 90 provide an ability to share performance and ratings (e.g., scores, rewards and the like) between and among a plurality of operators (e.g., classes or teams of students/trainees) via such mechanisms as electronic mail, electronic bulletin boards, social networking sites, and the like. In one embodiment, as also described in detail below, the communication connection 92 and the network 90 provide connectivity and operatively couple the powder coating simulator 20 to the LMS 170.

In one embodiment, the computing device 52 of the processing system 50 invokes one or more algorithms or subsystems 120 programmed and executing within the CPU, or hosted at a remote location and cooperating with the CPU, of computing device 52 to direct the device 52 to generate and to provide the 3-D powder coating spray environment 100. The subsystems 120 include, for example, a physics engine 122, a tracking engine 124, and a rendering engine 126. The physics engine 122 models an actual powder coating spray process and outputs a virtual powder coating spray pattern (e.g., the virtual powder coating 70 including the powder coating stream 72, and spray cone 71 and spray cloud 73 thereof, as well as the powder coating coverage 74) that is rendered on and near the work piece 30. The tracking engine 124 receives input and data from the powder coating environment 100 such as a spatial position (e.g., proximity and distance) and/or an angular orientation of the powder coating spray controller 60 from the work piece 30, as well as a direction, path and/or speed of movement of the controller 60 in relation to the work piece 30 and the work piece platform 80 as provided by the sensors 62 and 82. The tracking engine 124 processes the input and data and provides coordinates to the physics engine 122. The physics engine 122 models a powder coating spray application based on the received input, data and coordinates, to determine virtual powder coating spray pattern information. The physics engine 122 provides the determined virtual powder coating spray pattern information to the rendering engine 126 such that a virtual powder coating spray pattern (e.g., the virtual powder coating 70) is rendered in the 3-D powder coating spray environment 100.

In one embodiment, the operating environment of the powder coating simulator 20 is developed using the Unity game engine (Unity Technologies, San Francisco, Calif.) and operates on the Windows™ (Microsoft Corporation) platform. It should be appreciated that one or more of the subsystems 120 described herein (e.g., the physics engine 122, the tracking engine 124 and the rendering engine 126) may access the data store 140 including data describing an actual powder coating spray process 141, previous virtual powder coating spray patterns, scores and performance data 144 for one or more trainee/operators (e.g., the operator 10), and like powder coating simulation data as well as variables and/or parameters used by the powder coating simulator 20. It should be appreciated that the input and data is processed by the computing device 52 in near real-time such that the position, distance, orientation, direction and speed of movement of the powder coating spray controller 60 and path of the virtual powder coating 70 directed therefrom is depicted on the work piece 30 as the operator 10 is performing one or more passes of a powder coating operation. That is, characteristics of the path (e.g., speed, direction, overspray and/or under spray, and the like) are depicted on or near the work piece 30 as if the virtual coating 70 is actually being applied by the operator 10 operating the coating simulator 20. Further aspects of the coating simulator 20 and its presentation of coating coverage and controller paths, are described in detail below.

It also should be appreciated that the input data includes one or more parameters set by the operator 10 on the powder coating spray controller 60 and/or entered via the display device 56 simulating powder coating process setting such as, for example, a compressor setting of air pressure, flow rate of the powder coating and other powder coating spray process parameters, as are known in the art. Moreover, the operator 10 may enter parameters indicating a type or brand of powder coating spray controller 60 that is being modeled. Entering a type or brand of a spray controller 60 may indicate specific parameters to the processing system 50 that are unique to a type or brand of conventional powder coating spray controller. In some embodiments, the operator 10 may also enter environmental data such as, but not limited to, wind conditions, humidity, temperature, and/or an amount of sunlight or shade that are simulated within the 3-D powder coating spray environment 100. In effect, the physics engine 122, tracking engine 124 and rendering engine 126 simulate coverage of the work piece 30 by a selected coating in a non-virtual environment. The powder coating simulator 20 ensures accuracy of its simulation by depicting and selectively exhibiting one or more characteristics of the powder coating spray path including the region of coverage, whether coverage is on or off the work piece 30 (e.g., the powder coating spray cone 71 and spray cloud 73) and the like. In one embodiment, variations within the coverage pattern, for example, areas of below target, target and over target buildup (e.g., finish coat thickness) are depicted in one of differing colors or are identified by icons or other visual indicators on the work piece 30 during virtual application and/or subsequent thereto such as, for example, in one or more review or evaluation modes, a specific instructional mode and/or a playback mode, where one or more powder coating procedures are shown to the operator 10 (e.g., trainee), the instructor or certification agent 12, and/or other trainees.

Figure 14A:
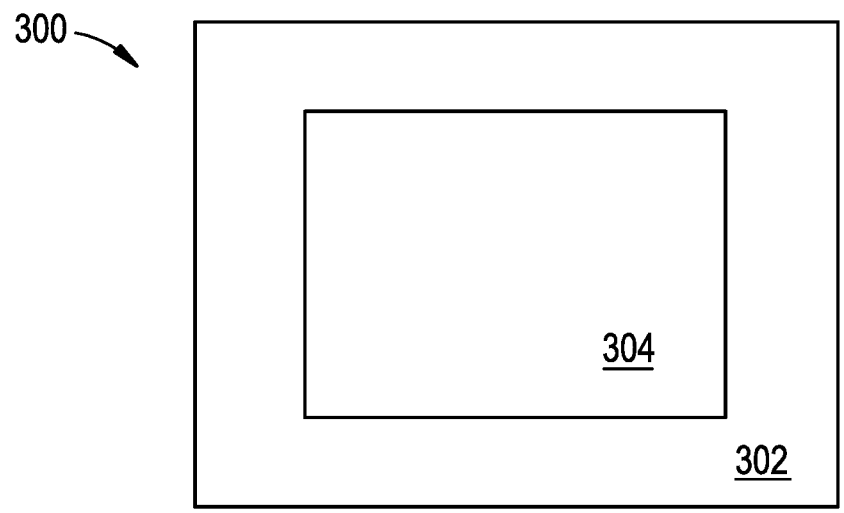
FIGS. 14A and 14B depict modeling of a virtual powder coating spray pattern employing a PAINTEL displacement map, according to one embodiment of the present invention.
Figure 14B:
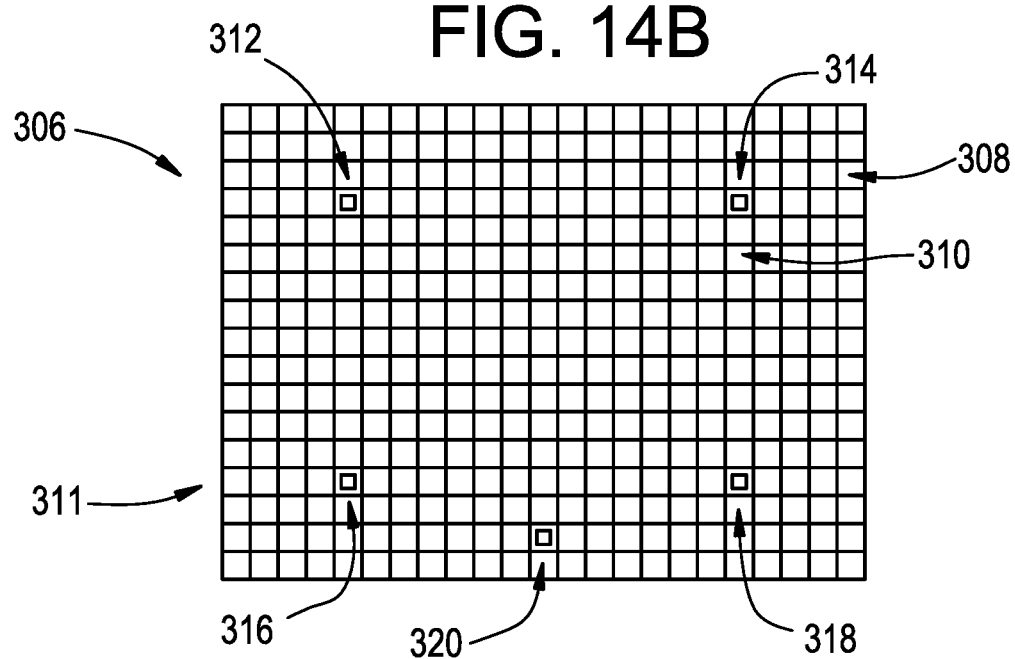

In some embodiments, referring to FIGS. 14A and 14B, a plurality of PAINTELs (e.g., a pixel for a paint and/or coating application) may be employed to model a virtual coating spray pattern and/or defects in the coating on a surface, where the PAINTELs are based on a displacement map. PAINTELs may be used to facilitate modeling of a coating pattern and defects that are associated with an application of the coating, such as, but not limited to, orange peel effects, pooling, drips or runs, tiger striping, or like defects. For example, FIG. 14A illustrates a surface of an object 300 to be coated that includes a first area 302 and a second area 304. The first area 302 and the second area 304 may comprise different materials, surface textures, or the like. For example, the first area 302 may comprise a metal frame and the second area 304 may comprise glass. As shown in FIG. 14B, a virtual object 306 may comprise a virtual representation of the surface of the object 300 to be coated. Like the object to be coated 300, the virtual object 306 includes a first virtual area 308 and a second virtual area 310. The virtual objet 306 may be represented by a grid or array of PAINTELs in a form of a PAINTEL map 311. Each PAINTEL 312, 314, 316, and 318 defines a portion of the virtual surface of the virtual object 306 and, as such, represents a portion of the surface of the object 300 to be coated. The PAINTEL map 311 defines the surface resolution as well as defines borders between different areas 308 and 310. Changeable parameter values are assigned to each PAINTEL, allowing values of each PAINTEL to dynamically change in real-time during a simulated coating process and allowing the operator 10 to adjust or maintain the application of the virtual coating pattern and thus, learn to apply the coating correctly. In some embodiments, the changeable parameter values correspond to, but are not limited to, color (coating color and/or wet look), shape, depth, viscosity, temperature, angular sheen, texture and/or like characteristics, which allow the PAINTELs 312, 314, 316 and 318 and the PAINTEL map 311 to model and graphically illustrate the virtual spray coating pattern and/or any defects therein. As illustrated in FIGS. 14A and 14B, PAINTELs 312, 314, 316, and 318 may further indicate a boundary between the first virtual area 308 and the second virtual area 310. For example, if the user 10 is assigned to paint only the first virtual area 308, any overspray onto the second virtual area 310 can be indicated by comparing the PAINTELs within the area defined by PAINTELs 312, 314, 316 and 318, to the overspray in the area defined by PAINTEL 320.

Referring again to FIG. 5, in one embodiment, the data store 140 is included within the LMS 170. The data and information 142 stored in the data store 140 may include, for example, training/lesson plans 146 including the skill-oriented tasks, steps or activities of the skilled-based disciplines presented by the powder coating simulator 20, and performance criteria 148 set by, for example, the instructor or teacher, agent, or the like monitoring the operator's progress both in terms of lesson completion and/or learning momentum and progress towards an objective educational or other academic standard as set by an industry, company, an educational institution, municipal/governmental or Industry Recognized Certification standards. In one embodiment, the training/lesson plans 146 assign a task that requires and, as needed, teaches a specific set of skills that builds toward a thorough exposure of all required competencies within the discipline being performed as set in accordance with, for example, the aforementioned educational or other academic standards and/or as set by or in accordance with an industry, company, an educational institution, municipal/governmental or Industry Recognized Certification standards. In one embodiment, the training/lesson plans 146 outline skill-based tasks and activities within a plurality of increasing degrees of skill such that an operator may accomplish intermediate steps toward acquiring or maintaining specific competencies within a discipline of interest and which are presented within the training/lesson plans 146. As noted above, the data and information 142 includes the performance data 144 which may include, for example, an indication of a number of training/lesson plans 146 completed and an indication of a number of lesson plans 146 passed (deemed acceptable in comparison to the performance criteria 148), learning momentum (e.g., frequency and/or regularity of activity in the simulator 20, knowledge retained by the operator and the like), progress toward achieving accreditation, and the like. The simulator 20 and the LMS 170 interact (via 2-way communication) to do updates, in addition to receiving the updates through a USB thumb drive, or like portable media, such that the data and information 142 stored in the data store 140 of the LMS 170 may be shared and/or supplemented by student operators 10 and other authorized persons 12, e.g., teachers, administrators of the simulator 20 and the like.

In one embodiment, the powder coating simulator 20 is operatively coupled to an Artificial Intelligence (AI) engine 190. The AI engine 190 is operatively coupled, directly or through the network 90, to the computing device 50 and/or the LMS 170. In one embodiment, the AI engine 190 accesses and analyzes performance data 144 from one or more of the student operators 10 and/or performance criteria 148 and identifies, for example, deficiencies in performance by individual and/or groups of student operators 10. In one embodiment, the AI engine 190 determines common and/or trends in deficiencies and recommends modifications to existing and/or new lesson plans 146 and skill-oriented tasks and activities therein, and/or to the performance criteria 148, with an aim of minimizing and/or substantially eliminating the identified and/or determined deficiencies through performance of the improved and/or new lesson plans 146 and evaluation thereof by improved and/or new criteria 148. It should be appreciated that the AI engine 190 may access and analyze performance data 144 and/or performance criteria 148 on-demand or iteratively to provide continuous learning improvements over predetermined and/or prolonged periods.

In one aspect of the invention, the powder coating simulator 20 enhances the sensory feedback provided to the operator 10 by the HMDU 40 and the controller 60 (e.g., the sensors 44 and 62, the display 46 and the haptic devices 64) by providing other sensory cues (e.g., visual, audio and/or tactile cues) as teaching aids and tools to reinforce preferred techniques as an application of the coating 70 is in-process (e.g., while performing a pass) and later during one or more evaluation or review modes.

Figure 2B:
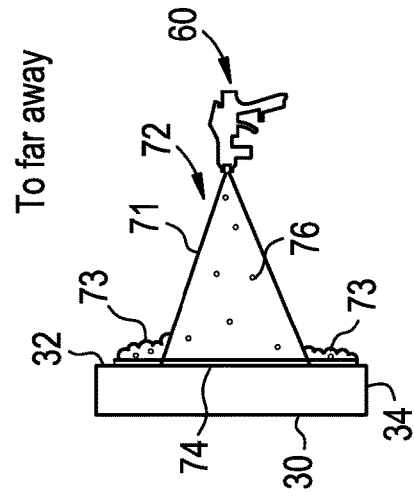
FIGS. 2A to 2E depicts characteristics of a virtual powder coating spray emitted by the powder coating simulator of FIG. 1, according to one embodiment of the present invention.
Figure 2A:
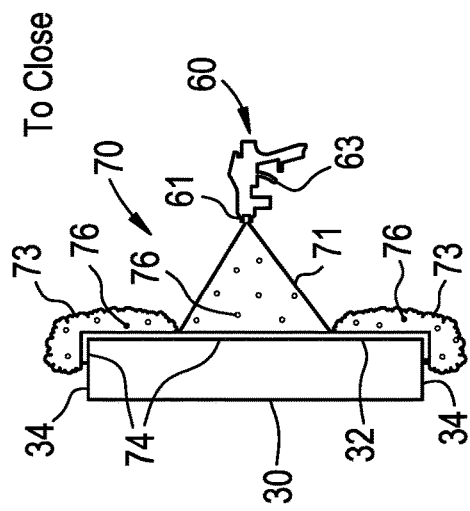
Figure 2E:
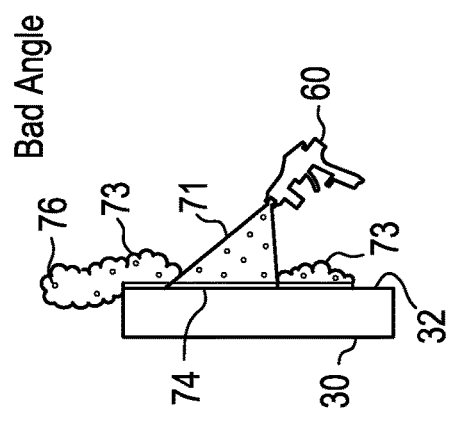
Figure 2D:
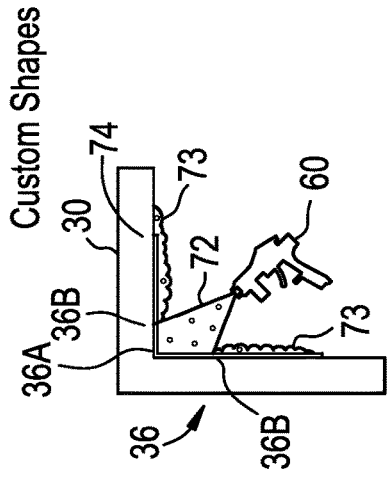
Figure 2C:
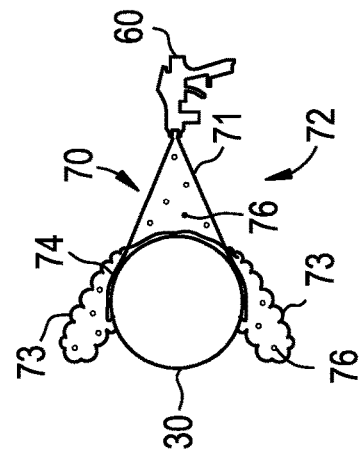

In one embodiment, as noted above, a visual cue includes the formation of the spray cone 71 and spray cloud 73 that are rendered differently visually to inform the operator 10 as the spray controller 60 moves to a position/distance that is too close to the work piece 30 (e.g., FIG. 2A, where the spray cone 71 is depicted widely and the spray cloud 73 is depicted as billowing away), or when the spray controller 60 moves to a position/distance that is too far away from the work piece 30 (e.g., FIG. 2B, where the spray cone 71 is depicted narrowly and the spray cloud 73 barely extends beyond the cone 71). It should be appreciated that the spray cone 71 and spray cloud 73 visual cues are provided during a coating process and not a review or evaluation mode. Rather, the visual cues are provided to the operator 10 as he/she operates the coating simulator 20 during a coating process such that the operator 10 may adjust, for example, the angle, distance, and/or speed of the spray controller 60 in relation to the work piece 30 and/or the work piece platform 80 during an on-going coating process (e.g., coating pass). Moreover, while a visual display of the spray cone 71 and spray cloud 73 are described above as providing an indication of performance characteristics, it should be appreciated that other visual or sensory cues may be used such as, for example, an audio tone (e.g., output by the speakers 48 of the HMDU 40 and/or external speakers 55) that may increase in volume or a repeated pattern as the controller 60 is positioned too close to the work piece 30 and/or decrease in volume or repeated pattern as the controller 60 is position too far from the work piece 30.

Figure 6A:
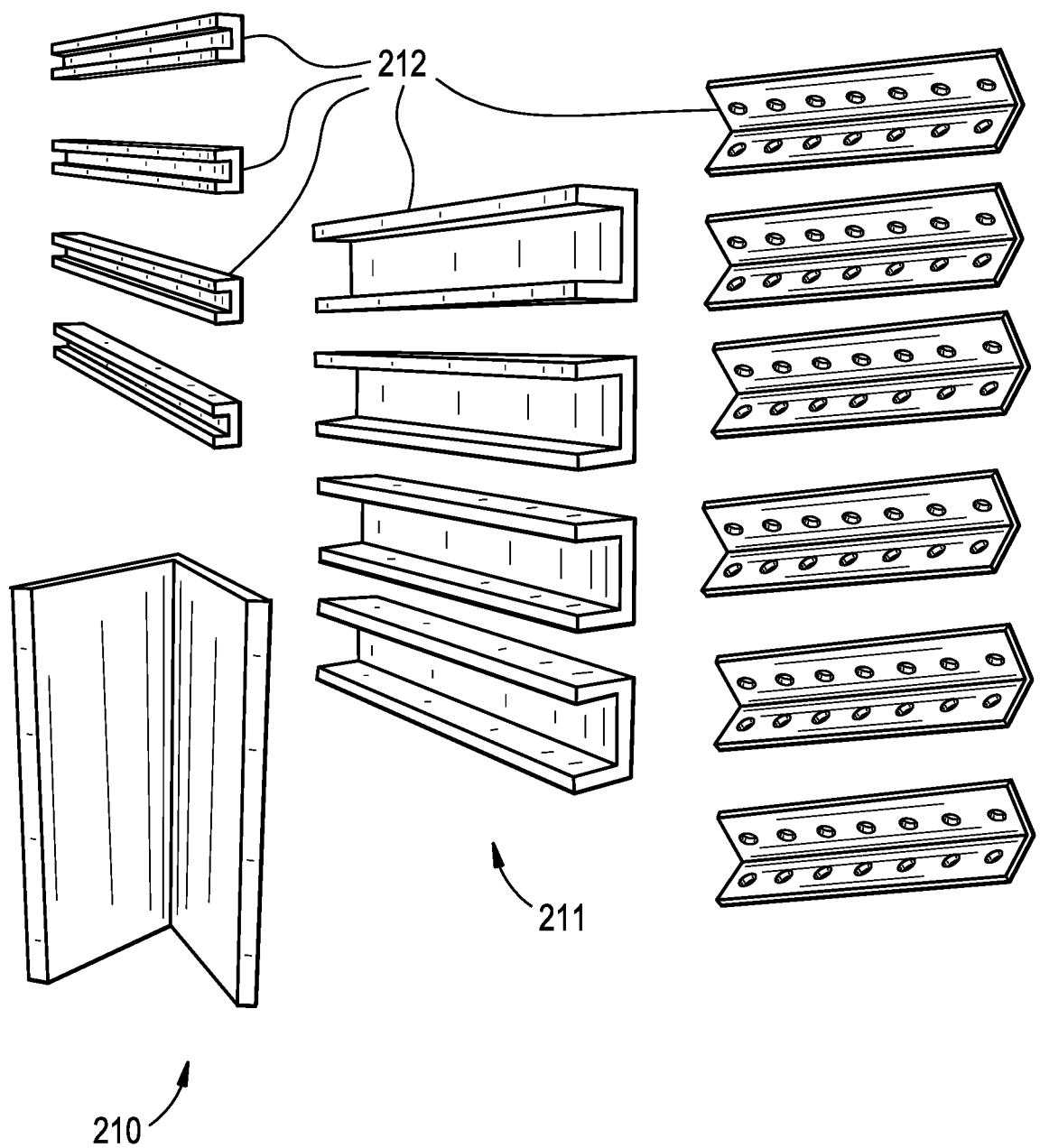
FIGS. 6A to 6C are graphical user interfaces depicting exemplary predefined work pieces for application of a coating with the coating simulator of FIG. 1, according to one embodiment of the present invention.
Figure 6B:
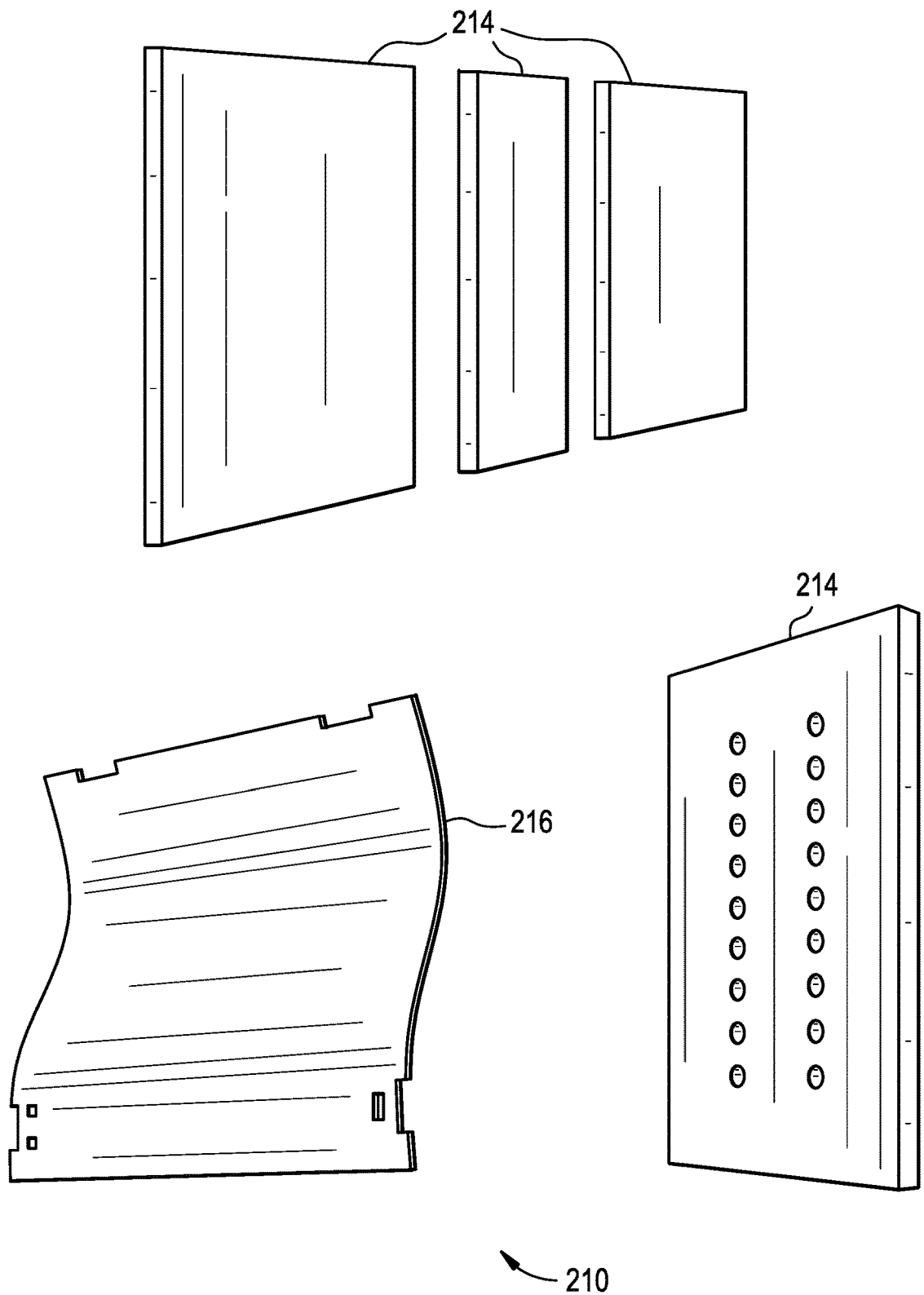
Figure 6C:
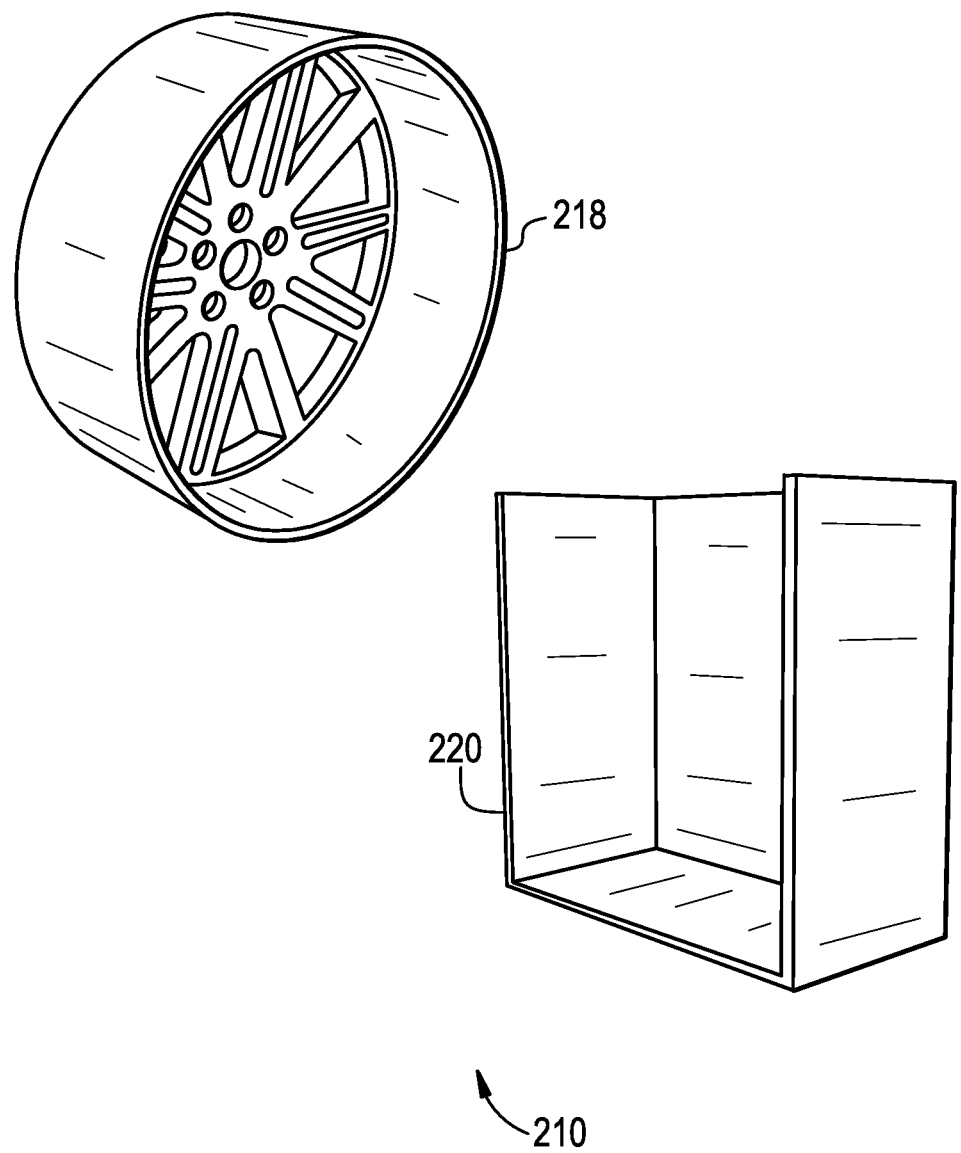

FIGS. 6A to 13B depict a plurality of graphical user interfaces (GUI) 200 of the coating simulator 20 that may be presented on one or both of the display device 56 coupled to the computing device 52 and/or the display 46 of the HMDU 40. In FIGS. 6A to 6C, a GUI 210 prompts the operator 10 to initiate the training session by selecting a work piece from a plurality of predefined work pieces 211. For example, GUI 210 presents work pieces having relatively simple configurations such as brackets and braces 212, some with and without holes therein (FIG. 6A), flat panels 214, with and without holes (FIG. 6B) to more complex work pieces including a curved panel 216 (FIG. 6B), wheel rim 218 (FIG. 6C) and multiple plane work pieces 220 (FIG. 6C). Each of the plurality of predefined work pieces 211 are modeled by the powder coating simulator 20 and may be selected by the operator 10. In one embodiment, models of other work pieces may be imported into the powder coating simulator 20 such that specific materials, configurations (e.g., parts) of interest, for example, to a particular company are available for training and practice procedures. As shown in FIG. 7, a GUI 230 prompts the operator 10 to select certain powder coating set-up parameters such as a powder type, powder coating color 232, 234, target powder coating coverage thickness 236, e.g., expressed as a mil. thickness (2.8 mil. shown), and surface/material type. In one embodiment, the powder coating simulator 20 incorporates a large variety of colors and types of powder coatings as well as sheens and/or textures (e.g., flat, semi-gloss, and the like). While not shown, it should be appreciated that one or more additional ones of the GUIs 200 prompt the operator to select settings for equipment used in the coating application, for example, setting of the powder coating gun or applicator controller 60, a compressor and the like. For example, the operator selects settings such as, for example, powder coating spray gun or applicator type, air pressure and flow rate. The selected settings are provided to and recorded by the data processing system 50 such that the operator's choice or selection may be captured and evaluated within an evaluation of his/her overall performance of a particular powder coating procedures, for example, from setup, startup of equipment, through use of equipment in application of a coating, to completion and shutdown of equipment, and cleanup.

Figure 8:
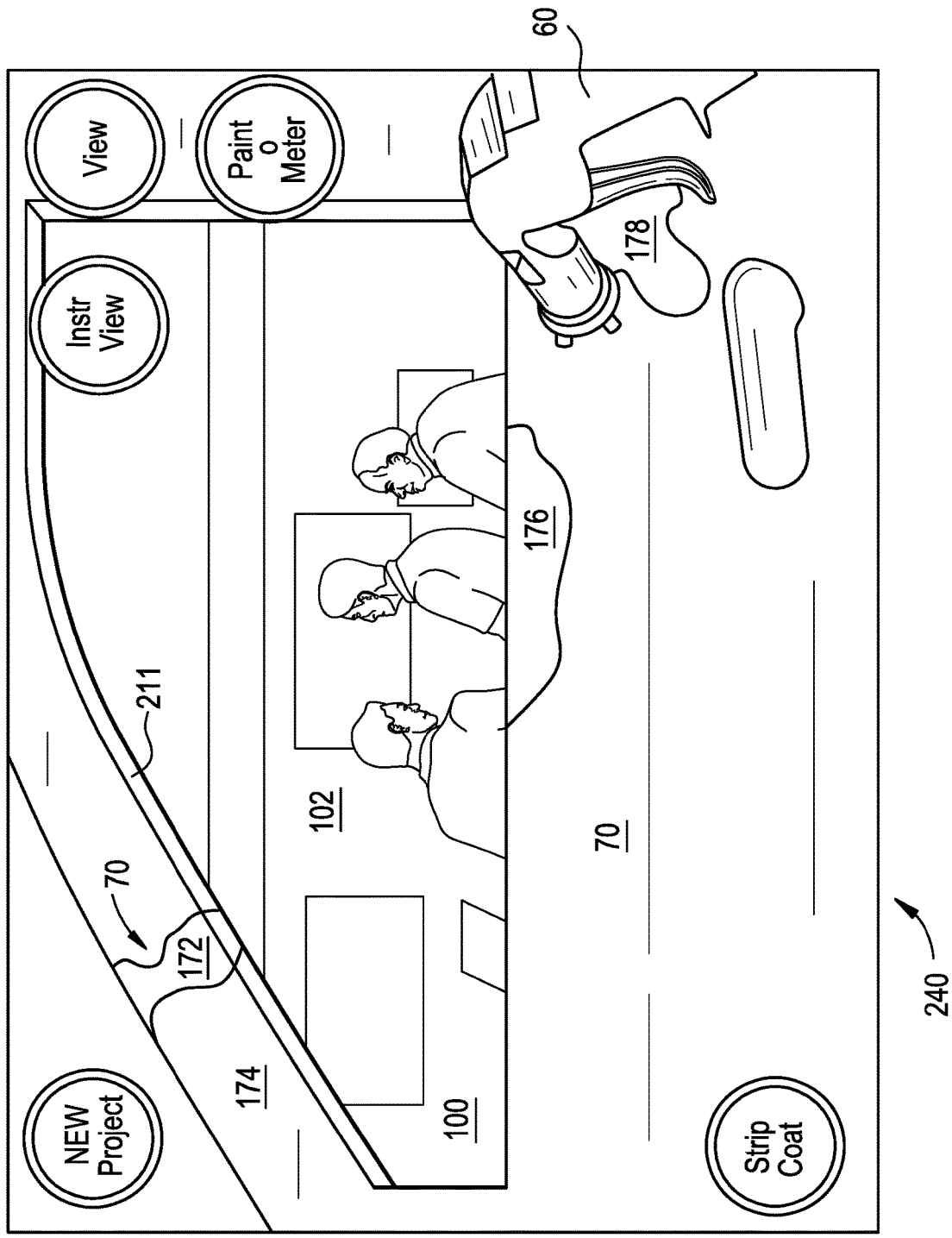
FIG. 8 is a graphical user interface depicting an exemplary view of a 3-D powder coating spray environment, according to one embodiment of the present invention.
Figure 9:
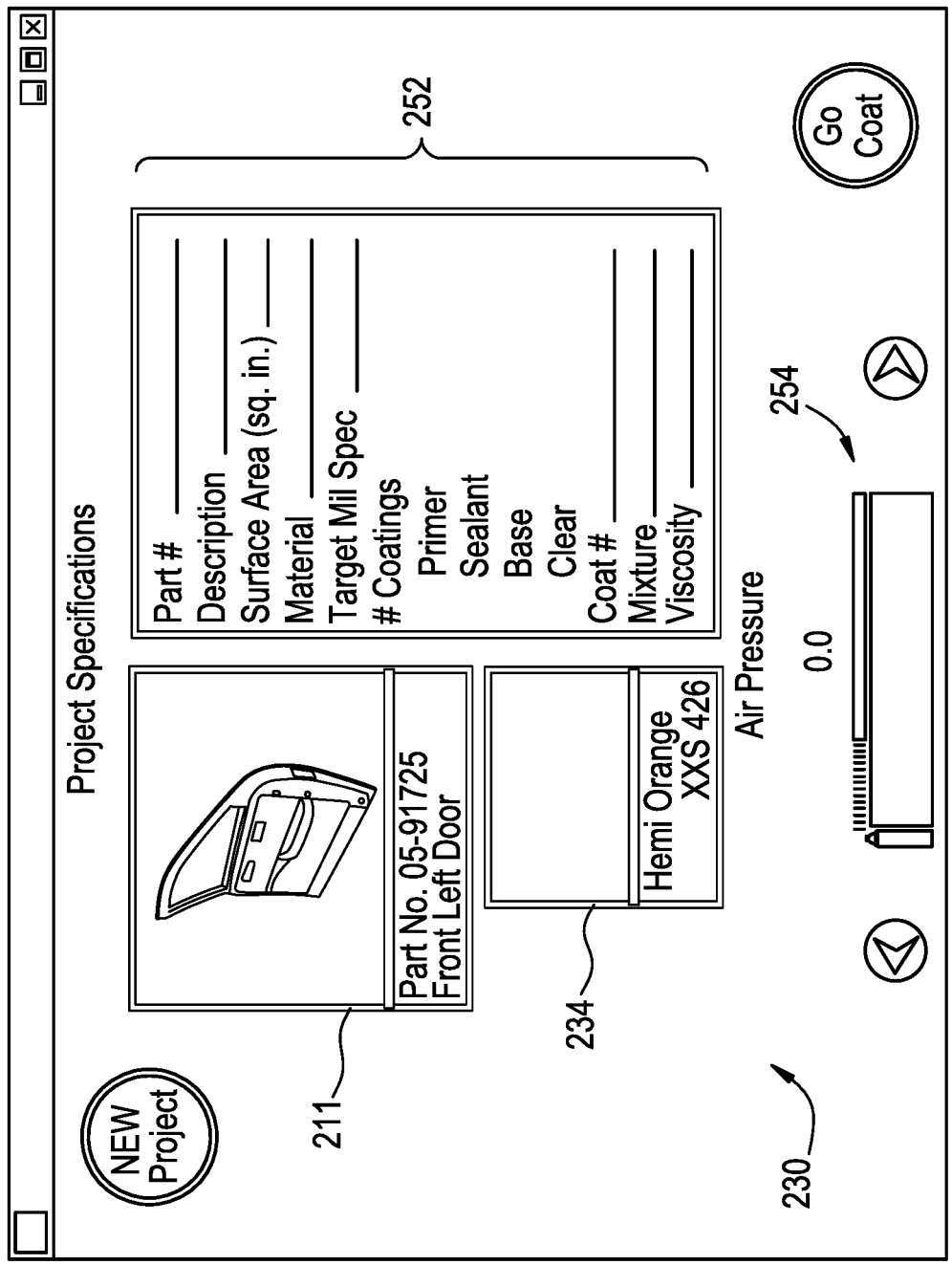
FIG. 9 is a graphical user interface depicting a powder coating project specification summary, according to one embodiment of the present invention.

FIG. 8 depicts the 3-D spray coating environment 100 on a GUI 240. For example, the GUI 240 depicts a rendering of the work piece 30 in a real-world setting 102. As shown in FIG. 8, the powder coating controller 60 is rendered and depicts application of the virtual powder coating 70 on the work piece 30, e.g., a door 211. The door 211 has been virtually powder coated using the finish coating color 234 selected on the GUI 230 (FIG. 7). It should be appreciated one or more regions of coverage 172, 174, 176 and 178 are depicted in the GUI 240 representing one or more thicknesses or accumulation of the powder coating 70. In FIG. 9, a GUI 250 presents a coating project specification summary 252 to the operator 10 and/or a trainer, teacher, evaluator or instructor 12. As shown in FIG. 9, the summary 252 highlights the operator's 10 choice of a part (e.g., part 211) and one or more powder coating (e.g., a coating 234) to be applied to the part during a powder coating spray application procedure using the powder coating simulator 20. The summary 252 further documents parameters set by the operator 10 such as, for example, air pressure 254, provided by a compressor to the controller 60.

As shown in FIGS. 10, 11, 12A to 12D, 13A and 13B, GUIs 260, 270, 280, 290 and 500, respectively, depict one or more performance, evaluation and instructional views provided by the powder coating simulator 20 of a powder coating spray application procedure. For example, as shown in FIG. 10, the GUI 260 depicts the work piece 30 (e.g., the door 211), the virtual powder coating 70 applied to the work piece 30 and the coverage regions 172, 174, 176 and 178 as well as real-time sensory instruction and/or guidance, for example, icons 262, 264, 266, 268 that highlight various characteristics (e.g., defects) of the application procedure. For example, the GUI 260 represents a Defect Mode which illustrates one or more defects symbols or icons, depicted in Defect Icons legend 261, as well as improper coverage overlap between the regions 172, 174, 176 and 178. In one embodiment, the icons include a "Too Close" indication 262 (e.g., a sensory indication that the spray controller 60 was held too close to the work piece 30 during a portion of the application procedure), a "Too Far" indication 264 (e.g., a sensory indication that the spray controller 60 was held too far from the work piece 30 during a portion of the application procedure), a "Bad Angle" indication 266 (e.g., a sensory indication that the spray controller 60 was held at an angle that is less than optimal for application of the subject coating), and a "Too Fast" indication 268 (e.g., a sensory indication that the spray controller 60 was moved too quickly across the portion of the work piece 30 such that less than optimal coverage was achieved). It should be appreciated that the present invention is not limited in this regard and that it is within the scope of the present invention to employ other display other icons highlighting same or different defects. In one embodiment, one of the icons 262, 264, 266, 268 in a specific area of coverage may be selected and, in response, the simulator 20 enlarges the area so that the selected defect can be examined and evaluated more closely by the operator 10 and/or instructor or certification agent 12.

Figure 13A:
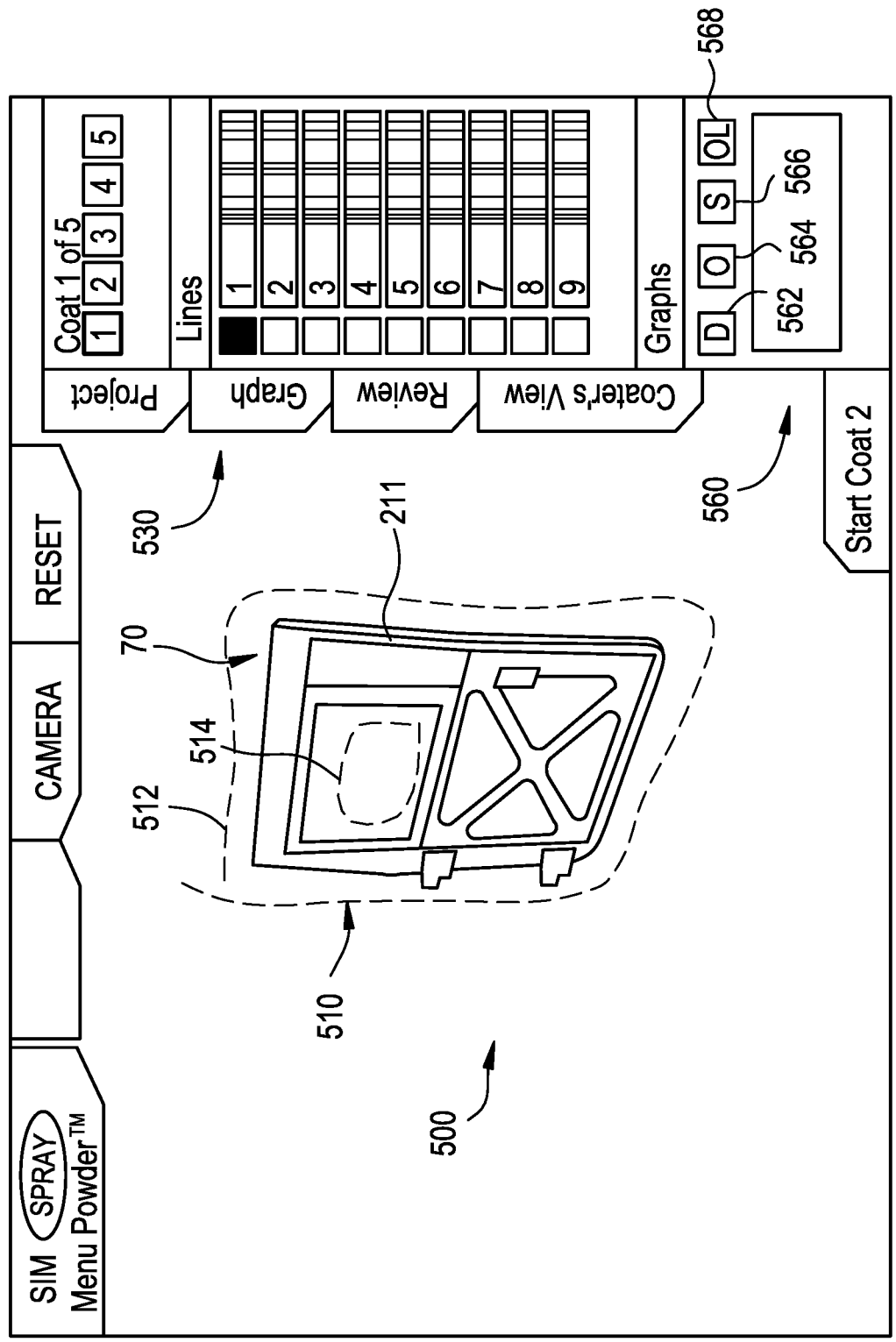
FIGS. 13A and 13B are exemplary graphical user interfaces depicting one or more paths of the spray controller of the coating simulator of FIG. 1 taken during a spray coating process, according to one embodiment of the present invention.
Figure 13B:
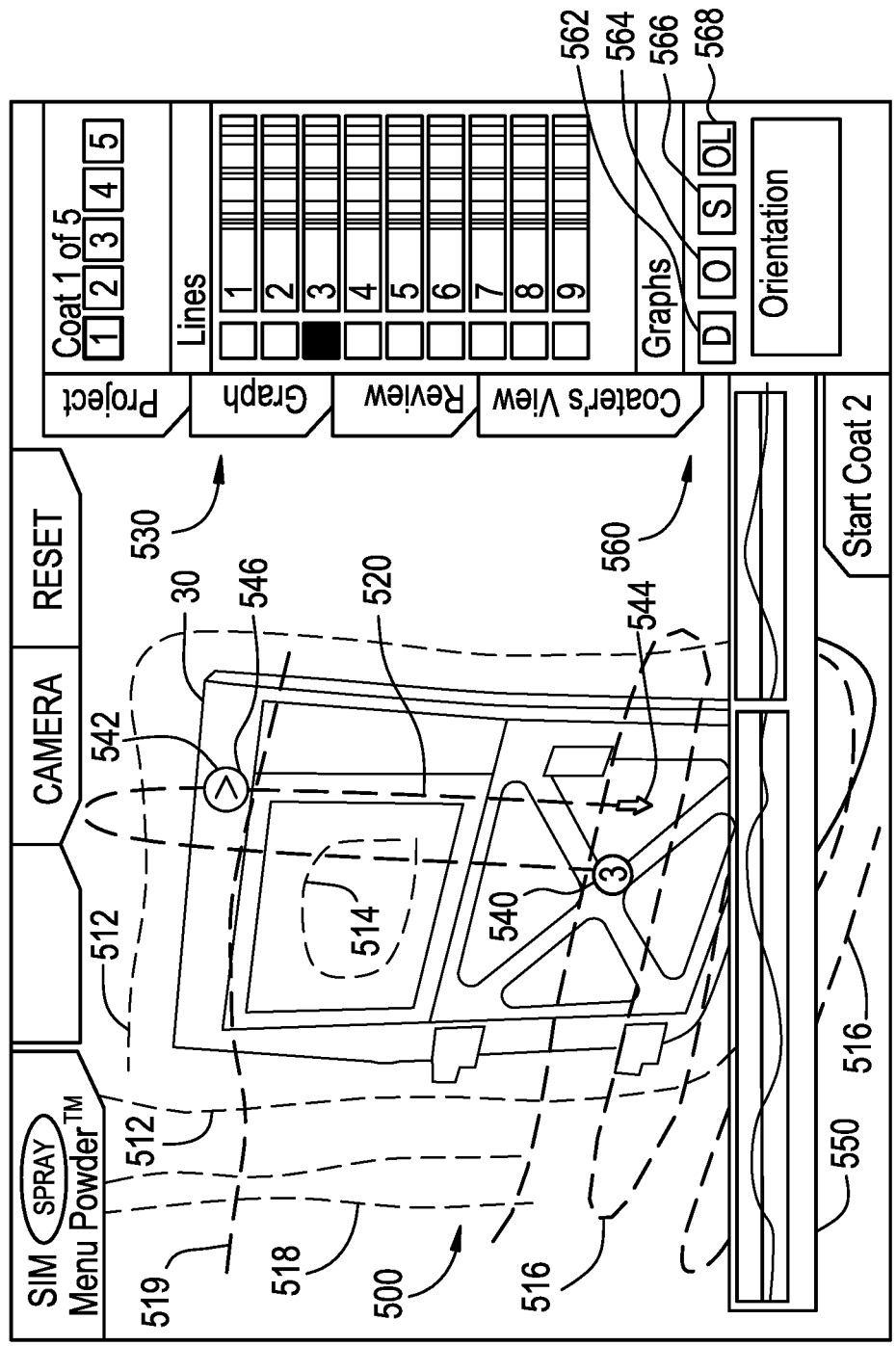

As shown in FIGS. 13A and 13B, the GUI 500 depicts the work piece 30 (e.g., the door 211), the virtual powder coating 70 applied to the work piece 30 and one or more paths or lines 510 (e.g., two paths shown) of the controller 60 during a powder coating pass or application. As noted above, the simulator 20 senses and tracks the movement of the controller 60 during a powder coating pass. In one embodiment, the path or line 510 is generated based upon the real-time position and orientation data collected by the simulator 20 (sensed, tracked and/or determined) detailing the operator's movement of the controller 60. In one embodiment, a new one of the lines 510 is formed when the operator 10 depresses (e.g., completely or incrementally) the trigger 63 of the controller 60 indicating the beginning of a coating pass and the line ends when the operator releases (e.g., completely or incrementally) the trigger 63. If the operator 10 holds the trigger 63 at one position for a time period during a pass that exceeds a predetermined threshold, which is common in more experienced operators, the simulator 20 divides the resulting line based upon, for example, a sensed or tracked change in direction of the controller 60. As shown in FIG. 13A, two lines 512 and 514 are formed from one or more powder coating passes. As shown in FIG. 13B, five lines 512, 514, 516, 518 and 520 are formed from one or more coating passes. As depicted in FIG. 13B, the GUI 500 provides a 3-D representation of the coating passes and lines 510 such that the lines 512, 514, 516, 518, 519 and 520 are rendered in, for example, a layered or tiered effect. The layered or tiered effect provides a representation of coating layers as applied by the operator 10. For example, a first pass (FIG. 13A) is made by the operator 10 and generates the lines 512 and 514. A second pass is performed by the operator 10 and generates the line 516, which is layered above the line 512. A third pass is made by the operator 10 and generates line 518, which is layered above the line 512. A fourth pass is made by the operator 10 and generates a line 519, which is layered above the line 512 and the line 518. A fifth pass is made by the operator 10 and generates a line 520, which is layered above the lines 512, 514, 516 and 519. In one embodiment, one or more of the lines 510 is color coded or otherwise made visually distinct. As shown in FIGS. 13A and 13B, a legend 530 depicts the various coding used to individually identify each of the passes or lines 510.

In one embodiment, the lines 510 may includes one or more visual cues illustrating aspects of the controller's path such as, for example, speed, direction, orientation, and the like. For example, as shown in FIG. 13B, a starting point of one or more of the lines 510 (e.g., line 520) is indicated by a ball or sphere icon 540, which may also include an alpha-numeric indication of the sequence of the pass within a number of passes, and a cone or arrow 544 depicts direction and/or an end point of the line 520. A change in speed and/or orientation of the controller 60 during a pass may be depicted on the lines 510 (e.g., line 520) by a second ball or sphere icon 546. In one embodiment, the icon 546 includes a specific indication of orientation of the controller 60 such as, for example, an arrow or cone 542 within the icon 546. In one embodiment, the combined cone 542 and icon 546 is referred to as a "Go-Cone." As can be appreciated, the Go-Cone may be repeated, altered and/or refreshed as the controller 60 proceeds along its path (e.g., along the line 520).

In one embodiment, the operator 10 and/or instructor 12 may select one of the lines 510. Once selected, characteristics of the line are illustrated. For example, one of a plurality of graphs (e.g., a graph 550) is rendered illustrating one or more aspects of the controller's path such as, for example, speed, direction, orientation, and the like, in the represented pass. In one embodiment, an information tab portion 560 of the GUI 500 allows selection from the plurality of graphs, for example, a "D" icon 562 invokes depiction of a distance graph (depicted similarly to graph 550), an "O" icon 564 invokes depiction of the orientation graph 550, a "S" icon 566 invokes depiction of a speed graph (depicted similarly to graph 550), and an "OL" icon 568 invokes depiction of an overlay or coverage graph (depicted similarly to graph 550).

As should be appreciated, it is within the scope of the present invention to provide more and/or different sensory indications (e.g., visual graphs and icons, audio and/or tactile indications) to illustrate, for example, both favorable and/or unfavorable aspects of the virtual powder coating application process being performed. It should also be appreciated that one or more of the sensory indications (e.g., the Defect Icons 262, 264, 266, and 268, lines 510, and other indications) are presented as the powder coating application procedure is being performed by the operator 10, for example, as the virtual powder coating 70 is being applied to the work piece 30, such that the operator 10 receives real-time feedback on his/her performance, as well as within the aforementioned evaluation and/or review modes. The inventors have discovered that this in-process, real-time sensory guidance (e.g., the visual, audio and/or tactile indications) can improve training of the operator 10 by influencing and/or encouraging in-process changes by the operator 10 such as positioning (e.g., proximity and/or angle) of the controller 60 in relation to the work piece 30. As can be appreciated, repeated performance at, or within a predetermined range of, optimal performance characteristics develops and/or reinforces skills necessary for performing a skill-oriented task. Accordingly, the powder coating simulator 20 and its real-time evaluation and sensory guidance toward optimal performance characteristics are seen as advantages over conventional training techniques.

Figure 12A:
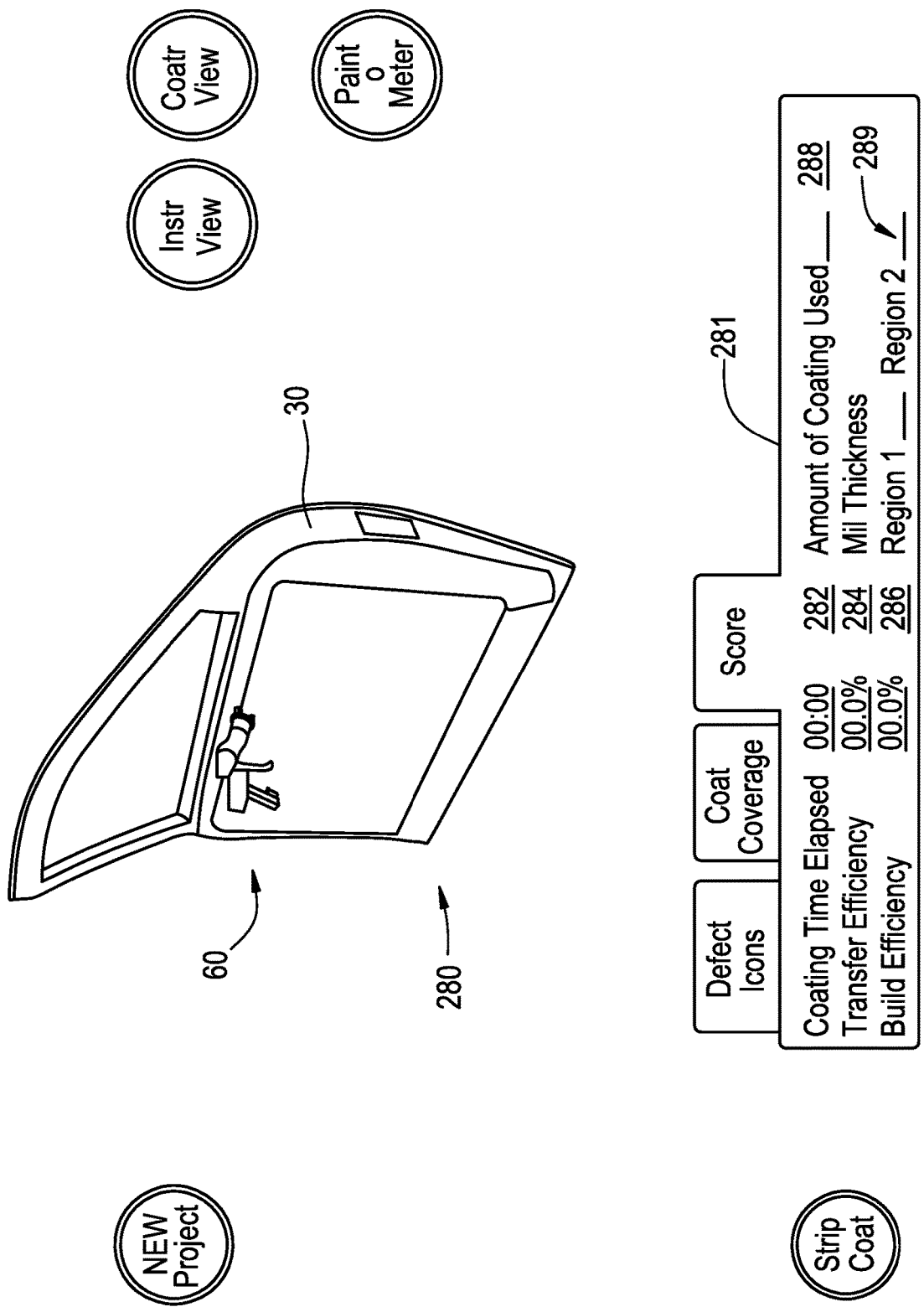
Figure 12B:
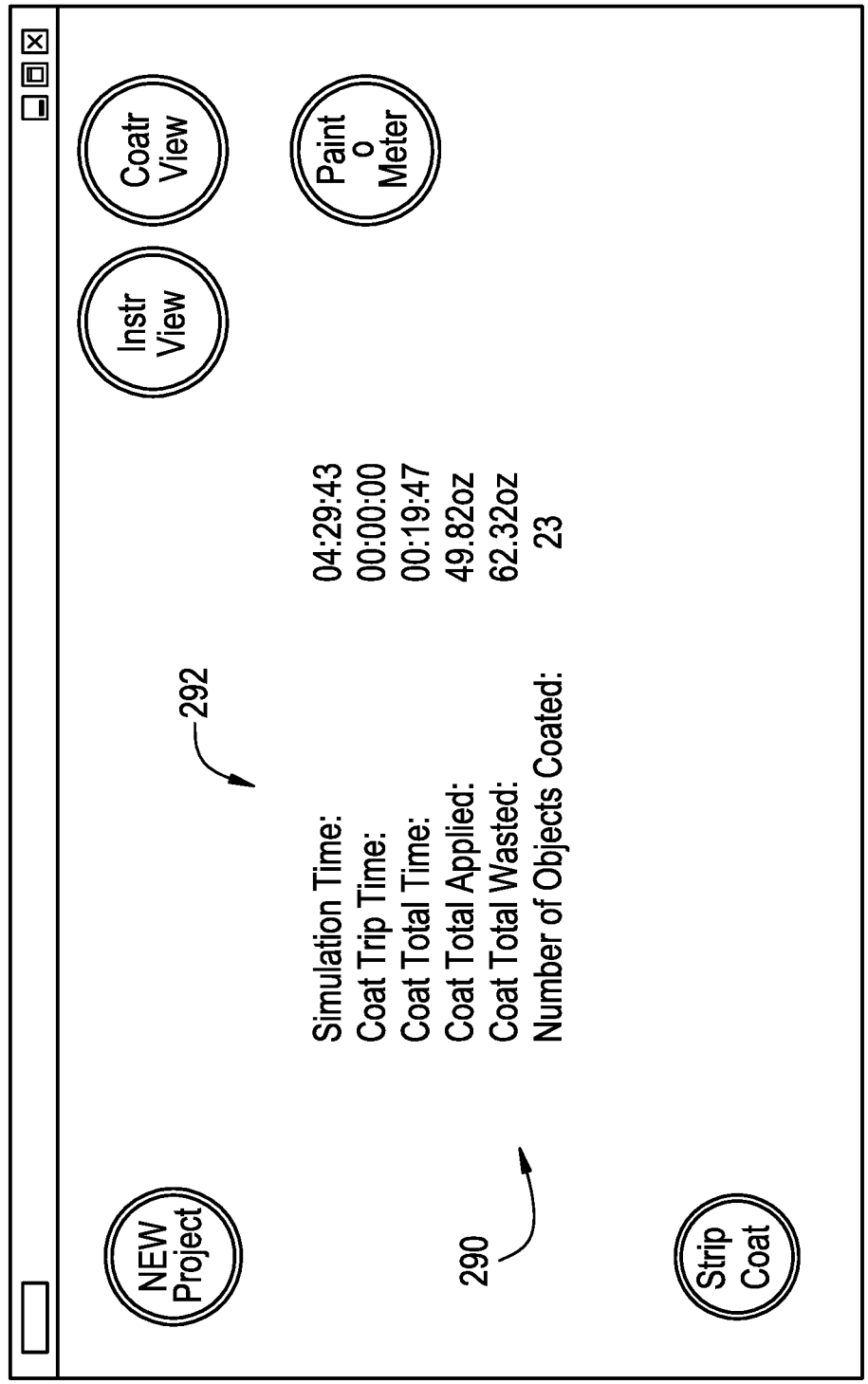
Figure 12C:
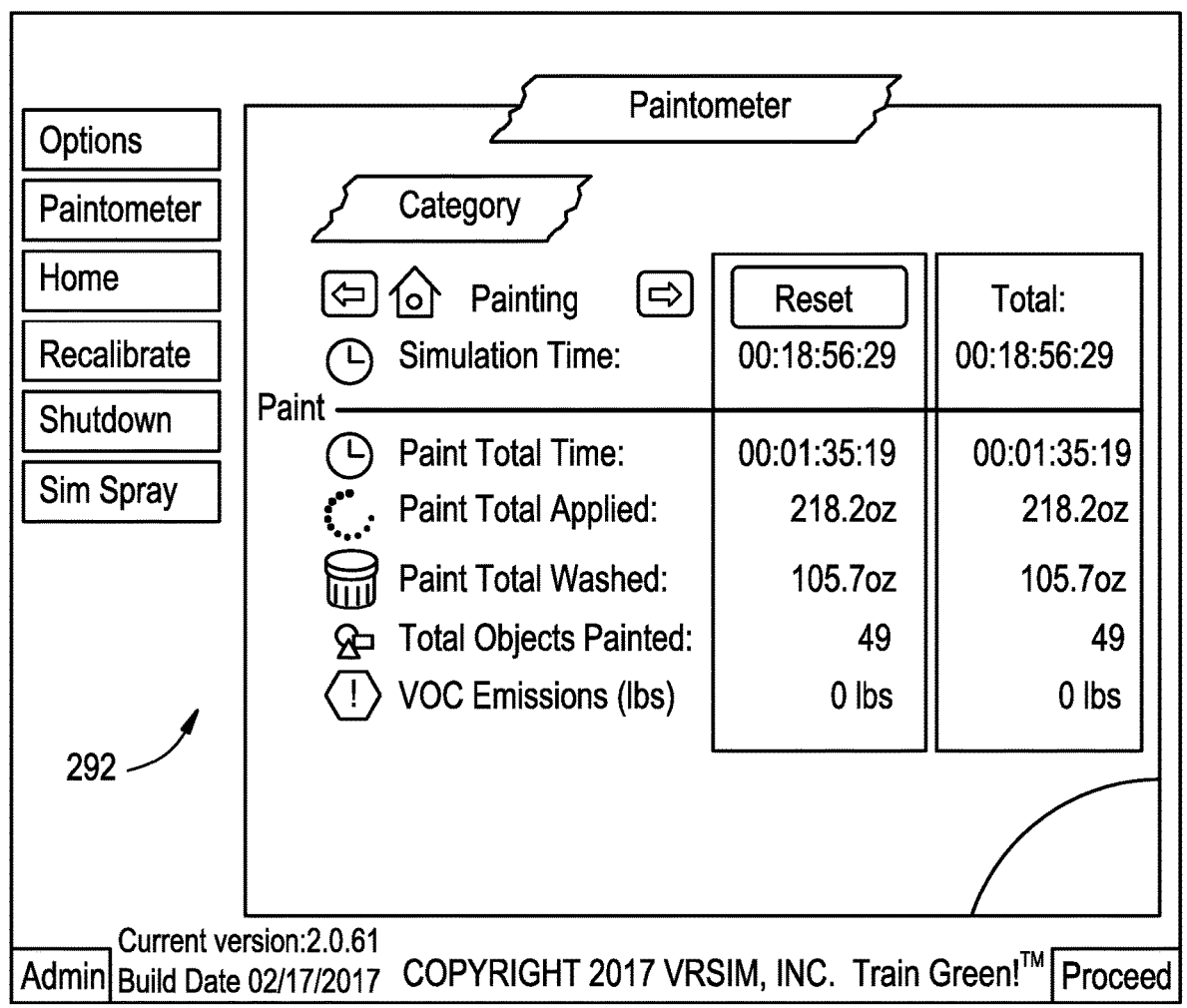

In FIG. 11, the GUI 270 depicts the coverage regions 172, 174, 176, and 178 and their boundaries by visually indicating a color coding scheme. The color code scheme, as indicated in Coating Coverage legend 271, highlights areas/regions where the powder coating was applied in a particular manner, e.g., "light" 272, "good" 274, and "heavy" 276. In FIG. 12A, the GUI 280 presents performance data to the operator 10 and/or instructor 12. The performance data collected and presented at a Score legend 281 includes, for example, Coating Time Elapsed 282, Transfer Efficiency 284, Build Efficiency 286, Amount of Coating Used 288 and approximate Mil Thickness 289 thus providing the operator 10 and/or instructor 12 with feedback as to the operator's performance. In one embodiment, the depiction of the work piece 30 may illustrate one or more of the performance parameters with color, shading, icons or the like. Additionally, the GUI 280 may selectively compare the performance of a current session/powder coating application procedure to one or more previous sessions to measure a positive or a negative trend in performance at or toward optimal and/or satisfactory ranges. In FIG. 12B, the GUI 290 provides summary information 292 that highlights performance characteristics as well as factors that may be used in, for example, a return on investment ("ROI") determination demonstrating cost benefits achieved by using the inventive powder coating simulator 20 for skill-oriented training. In one embodiment, illustrated in FIGS. 12C and 12D, the GUI 290 is provided as a Powderometer™ GUI 292 (POWDEROMETER is a trademark of VRSim, Inc., East Hartford, Conn. USA). The Powderometer GUI 292 illustrates one or more informational and/or instructional aspects of a previous simulation session to the operator 10 and/or instructor 12 with respect to the operator's performance. In one embodiment, one of more of the GUIs 260 (FIG. 10), 270 (FIG. 11) and 280 (FIG. 12A) may include features and functions for the instructor 12 to highlight and discuss one or more of the performance measurements on the work piece 30 during or after a session/powder coating application procedure to even further facilitate the operator's learning.

It should be appreciated that, as illustrated in FIGS. 12A to 12D, the powder coating simulator 20 automatically analyze the sensed and tracked data and information to determine performance characteristics of the operator 10 performing the virtual coating process, as well as quality characteristics of the virtual coating finish produced by the virtual coating process. For example, the powder coating simulator 20 may analyze and score the performance characteristics of the operator 10 and the quality characteristics of the virtual powder coating 70 as applied to the work piece 30. Exemplary performance characteristics of the operator 10 may include, but are not limited to, a powder coating trajectory (e.g., angle), a speed of the spray controller 60, pitch and roll angles of the spray controller 60 (e.g., orientation), and elapsed time of the powder coating process. The quality characteristics of a finished powder coating produced by the virtual powder coating process may include, for example, a depth of coverage as well as discontinuities, defects, and flaws within certain regions of a coating produced by the virtual powder coating process both before and after "bake" (heating and curing).

Furthermore, in some embodiments, the performance characteristics associated with the operator 10 and/or the quality characteristics associated with a virtual powder coating 70 may be used to provide a measure or score of a capability of the operator 10, where a numeric score is provided based on how close to optimum (e.g., preferred, guideline, or ideal) the operator 10 is for a particular tracked parameter, and depending on a determined level of defects, or other parameters associated with the virtual powder coating finish (both before and after bake).

As described above, the powder coating simulator 20 tracks, records and utilizes various cues and sensory indications to exhibit both favorable and/or unfavorable aspects of the virtual powder coating application process being performed by the operator 10. In one aspect of the invention, the simulator 20 evaluates an operator's performance (e.g., equipment settings, controller movement (e.g., speed, direction or path, orientation, distance), and the like) to a set of performance criteria established by, for example, the instructor or certification agent 12 and/or industry standards of acceptability. In one embodiment, the powder coating simulator 20 based evaluation yields scores and/or rewards (e.g., certification levels, achievement badges, and the like) highlighting the operator's results as compared to the set of performance criteria and, in one embodiment, as compared to other trainees. The scoring may be determined and/or presented both on a pass-by-pass basis, and on a completed task basis. As noted above, the scoring may include evaluations of controller movement (e.g., speed, orientation, distance) and other coating parameters such as elapsed time, transfer efficiency, application efficiency (e.g., material and emissions savings), trigger presses versus timing, and coverage (e.g., perceived good and bad coverage). In one embodiment, the scoring and/or rewards are stored in the simulator 20, for example, within the aforementioned scores and performance criterion 144 of the data store 140 for one or more trainee/operators 10. In one embodiment, the scoring and/or rewards may be downloaded and transferred out of the simulator 20 such as, for example, via a UBS port on the computing device 52. In one embodiment, scoring and/or rewards for one or more trainees (e.g., the operators 10) may be shared electronically, for example, included in electronic mail messages, posted on company and/or industry websites and bulletin boards, and over social media sites. In one embodiment, one or more of the operators 10 may provide records of scores and/or achieved levels of skill and/or certification as, for example, a portfolio 147 of certifications and/or sample performances that can be viewed and evaluated by potential employers and the like.

Figure 15A:
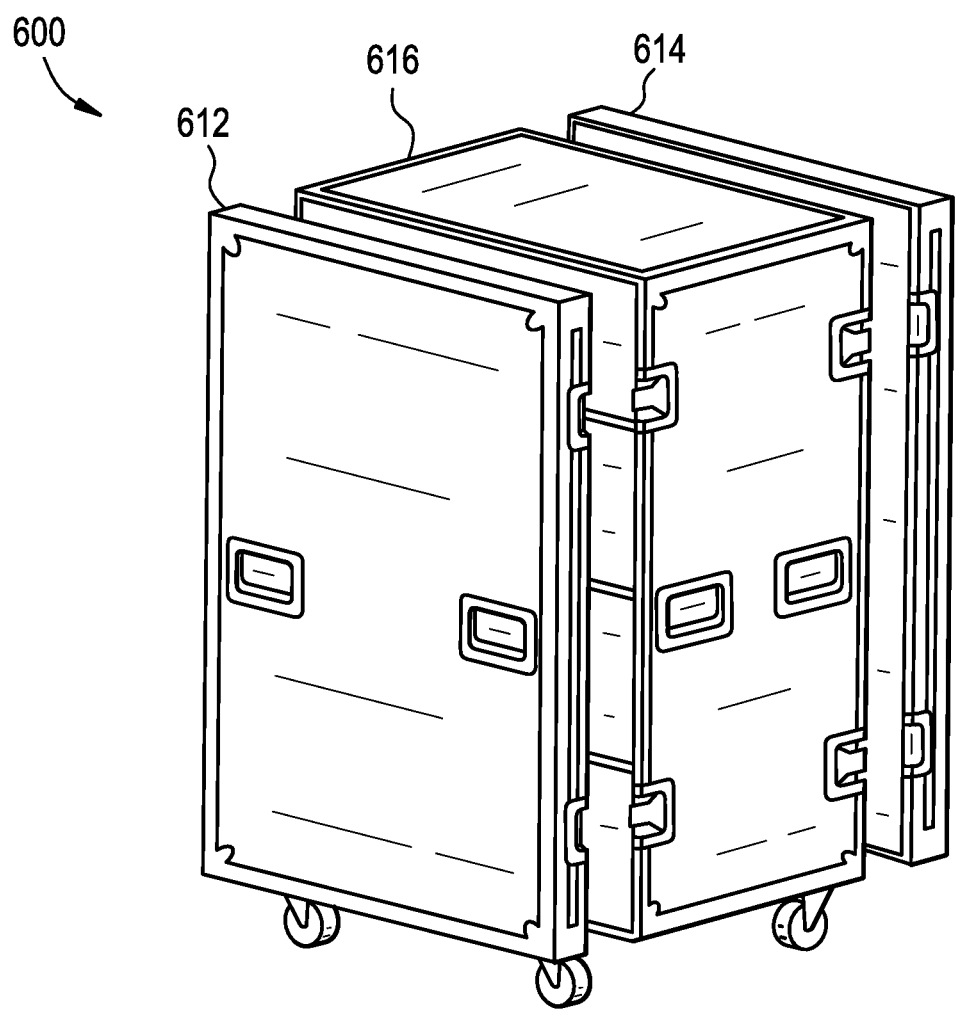
FIGS. 15A and 15B depict a portability feature of the coating simulator of FIG. 1, according to one embodiment of the present invention.
Figure 15B:
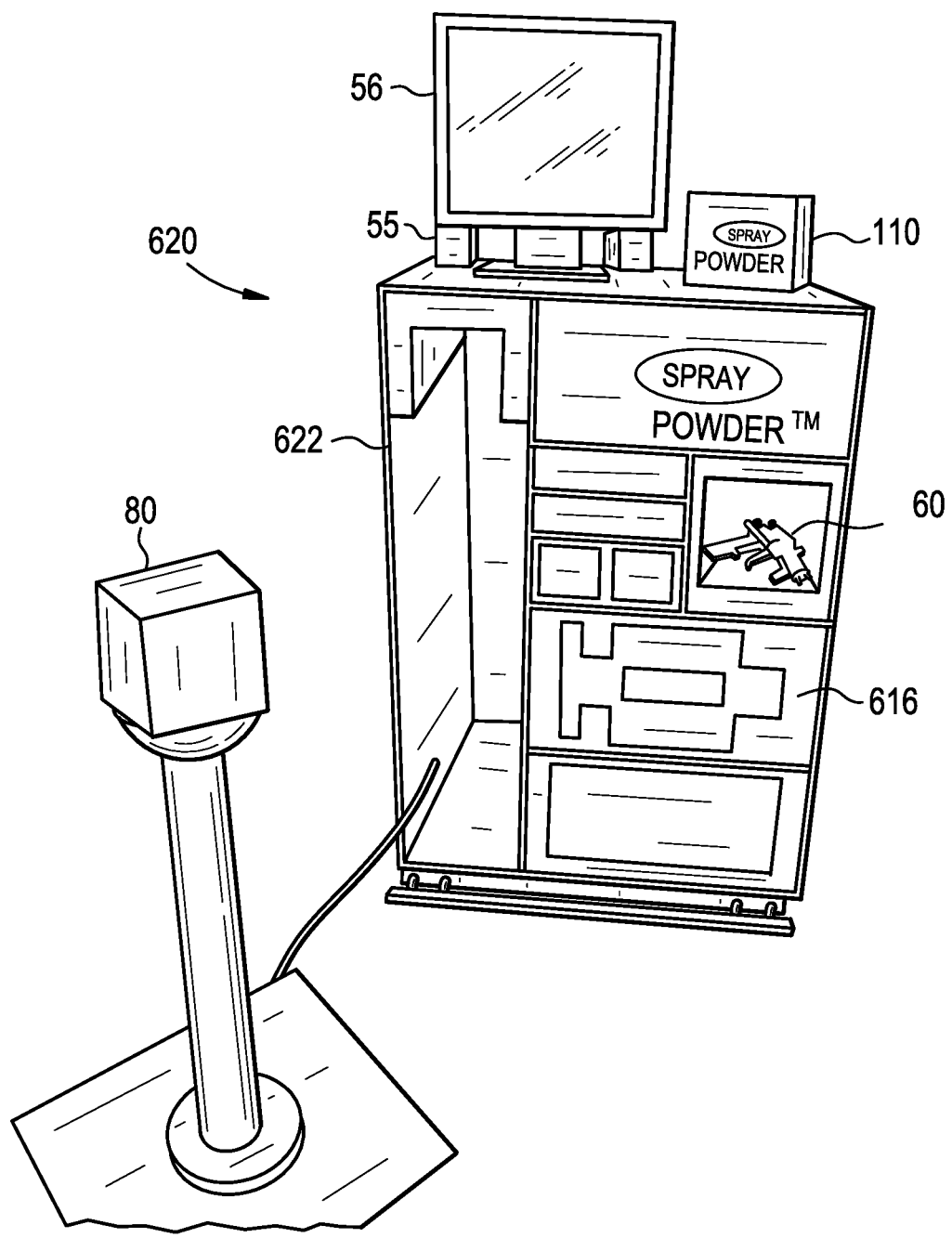

In one aspect of the present invention, illustrated in FIGS. 15A and 15B, the powder coating simulator 20 is portable (e.g., transferable) as a self-contained modular assembly 600. The modular assembly 600 includes case or trunk 610 having a removable front panel 612 and a removable rear panel 614 selectively coupled to a central cabinet 616 (FIG. 15A). Once the panels 612 and 614 are removed, one or more interior chambers or compartments 620 within an interior of the central cabinet 616 are revealed (FIG. 15B). As illustrated in FIG. 15B, components of the powder coating simulator 20 may be stored within the compartments 620 for storage and/or transportation. For example, the work piece platform 80 is stored in compartment 622. Similarly, external devices such as the speakers 55 and the display 56 are also stored within the compartments 620.

In one aspect of the invention, the portability of the powder coating simulator 20 supports training outside a formal training environment. For example, the operators 10 may initially utilize the simulator 20 at home or at their workplace without supervision by the instructor 12 as a mechanism for early exposure to the skills needed to successful perform at acceptable levels. Once the operator 10 achieves a basic understanding of the skills, training with the instructor 12 can focus upon the operator's demonstrated weaknesses while only reinforcing demonstrated strengths. This focused and/or targeted training is seen as an advantage provided by the powder coating simulator 20 as it concentrates instruction upon demonstrated strengths and weaknesses to maximize instructor-student interaction. As can be appreciated the demonstrated strengths and weaknesses can be shown to the instructor 12 at an individual trainee level as well as a team or class of trainees' level. In addition to use as an initial introduction to skills, the portability provides an ability for an operator having continued deficiencies in one or more skills to take the simulator 20 away from the training environment (e.g., to his/her home or work place) and focus upon specific areas of concerns outside the scheduled training time.

Some perceived benefits of the powder coating simulator 20 include, for example:
1. Innovation—provide a boost to training programs by utilizing a state-of-the-art tool.
   a. Breakthrough virtual and augmented reality technology are used to simulate real powder coating spraying processes.
   b. Real powder coating spray gun/applicator and peripheral equipment provides the "look and feel" of real world powder coating spray operations.
   c. No spray booth is required
   d. The simulator and training equipment are portable for easy setup in any classroom environment.
   e. The simulator and training equipment are cost effective.
2. Education—Increase valuable hands-on training.
   a. Instructors:
      (1) Set the specific part, powder and coating requirements.
      (2) Immediately evaluate the powder coating spray gun's position, distance, and speed to pinpoint deficiencies and/or errors in technique.
      (3) Rotate and inspect the virtual work-piece for powder coating coverage and consistency.
      (4) See savings and return on investment figures in a Powderometer™ graphical user interface.
   b. Students:
      (1) Toggle real time motion tracking cues to learn proper powder coating spray techniques.
      (2) Discover what techniques can produce defects.
      (3) Learn in a safe environment without potentially hazardous fumes and chemicals.
      (4) Practice more, in less time as set-up and clean-up is substantially minimized.
3. Conservation—Reduce the carbon footprint of the training.
   a. Environmentally friendly:
      (1) Minimize over spray.
      (2) Decrease need for rework.
      (3) Limit release of hazardous volatile organic compounds (VOCs).
   b. Save Cost of:

(1) Materials—parts, powders, thinner, air filters, and cleaning supplies.
(2) Energy consumption.
(3) Hazardous material disposal fees.

While the invention has been described with reference to various exemplary embodiments, it will be understood by those skilled in the art that various changes may be made and equivalents may be substituted for elements thereof without departing from the scope of the invention. For example, while described above as a powder coating spray simulator that simulates application of a powder coating to a work piece, in other applications the features and functions of the simulator may be implemented to train operators in, for example, any skill-oriented task such as ablation processes, sandblasting and other removal processes, welding, plumbing and other operations performed by skilled tradesmen. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A simulator for skill-oriented training of a task, the simulator comprising:
    a work piece platform having at least one platform sensor;
    a head-mounted display unit (HMDU) wearable by an operator operating the simulator, the HMDU having at least one camera, at least one speaker and at least one HMDU sensor, the at least one camera and the at least one speaker providing visual and audio output to the operator;
    a controller operable by the operator, the controller having at least one controller sensor, the at least one controller sensor, the at least one HMDU sensor, and the at least one platform sensor, each cooperating to measure and to output one or more signals representing spatial positioning, angular orientation and movement data of the controller relative to a work piece rendered on the work piece platform during one or more passes of a powder coating spray process, the work piece rendered as at least one of an electrically charged or grounded work piece;
    a data processing system coupled to the work piece platform, the HMDU, and the controller, the data processing system including a processor and memory operatively coupled to the processor with a plurality of executable algorithms stored therein, the processor configured, by the executable algorithms, to:
        determine coordinates of a position, an orientation, and a speed of movement of the controller in relation to the work piece rendered on the work piece platform during the one or more passes of the powder coating spray process based on the one or more signals from the at least one controller sensor, the at least one HMDU sensor and the at least one platform sensor;
        model the powder coating spray process to determine a powder coating stream, charged particles of the powder coating stream, a path of travel of each of the charged particles due to attraction to the work piece, and a powder coating coverage applied on the work piece from the coordinates and speed of movement of the controller in relation to the work piece;
        render the powder coating stream, the charged particles, the path of travel of each of the charged particles, the applied powder coating coverage, and sensory guidance as to the performance of the powder coating spray process by the operator in a three-dimensional virtual training environment, in response to the modeled powder coating spray process; and
        simulate in real-time the three-dimensional virtual training environment depicting the rendered work piece on the work piece platform, the rendered powder coating stream depicting the charged particles emitted from the controller along respective paths of travel, the rendered powder coating coverage depicting the applied powder coating coverage as the powder coating stream is applied to the work piece during one or more passes of the powder coating spray process performed by the operator in the training environment, and the rendered sensory guidance;
    wherein the rendered powder coating stream, the rendered charged particles, the rendered path of travel of each of the charged particles, the rendered applied powder coating coverage, and the rendered sensory guidance are exhibited in near real-time to the operator within the training environment to provide in-process correction and reinforcement of preferred performance characteristics as the operator operates the controller; and
    wherein the rendered sensory guidance includes a plurality of visual, audio and tactile indications of performance by the operator operating the controller relative to the work piece rendered on the work piece platform as compared to optimal values for each position and orientation within the one or more passes of the powder coating spray process, the position and orientation components including a speed and direction of the one or more passes of the powder coating spray process and proximity of the controller relative to the work piece.

2. The simulator of claim 1, wherein the path of travel of each of the charged particles is modeled, based on at least one of a position, orientation, and speed of movement of the controller when the charged particle is emitted, and on one of a plurality of simulated environmental conditions.

3. The simulator of claim 2, wherein the plurality of simulated environmental conditions includes an electrostatic field about the work piece.

4. The simulator of claim 1, wherein the path of travel of each of the charged particles is modeled to include interaction between one or more charged particles emitted from the controller as the particles collide or break up in the path of travel toward the work piece.

5. The simulator of claim 1, wherein the visual indications of performance include an indication of when the controller is operated at least one of too close in position to the work piece, at an optimal position to the work piece, and too far in position from the work piece.

6. The simulator of claim 1, wherein the rendered applied powder coating coverage is depicted to include a plurality of coverage regions and the visual indications include one or more icons highlighting one or more of the plurality of coverage regions having less than optimal characteristics.

7. The simulator of claim 6, wherein the one or more icons include a Too Close indication icon, a Too Far indication icon, a Bad Angle indication icon and a Too Fast indication icon.

8. The simulator of claim 1, wherein the audio indications of performance include an audio tone output by the at least one speaker of the HMDU.

9. The simulator of claim 8, wherein the audio tone includes at least one of increases in volume and repeated pattern as the controller is positioned too close to the work piece, and decreases at least one of decreases in volume and repeated pattern as the controller is position too far from the work piece.

10. The simulator of claim 1, wherein the visual indications of performance include a plurality of lines, presented within the three-dimensional virtual training environment, the plurality of lines visually presenting paths of the controller during the one or more passes of the powder coating spray process.

11. The simulator of claim 10, wherein the plurality of lines is presented in a layered effect representing successive applications of the rendered powder coating to the work piece such that a first line representing a first path is over layered by a second line representing a second path.

12. The simulator of claim 10, wherein the plurality of lines includes one or more visual cues illustrating the controller's speed, direction and orientation along the path.

13. The simulator of claim 1, further including a display device operatively coupled to the data processing system such that an instructor may monitor the performance of the operator of the controller.

14. The simulator of claim 1, wherein the controller further includes one or more haptic devices that impart at least one of forces, vibrations and motion to the operator of the controller.

15. The simulator of claim 14, wherein the forces, vibrations and motions from the haptic devices simulate the emission of the rendered powder coating stream.

16. The simulator of claim 1, wherein the visual indications include a score of the operator in equipment settings and controller movement including speed, direction or path, orientation, and distance, as compared to a set of performance criteria to standards of acceptability.

17. The simulator of claim 16, wherein the score is a numeric score based on how close to optimum the operator's performance is to the set of performance criteria.

18. The simulator of claim 16, wherein the score further includes rewards including certification levels and achievement badges highlighting the operator's results as compared to the set of performance criteria and to other operators.

19. The simulator of claim 18, wherein the score and rewards for one or more operators are at least one of shared electronically, posted on a website or bulletin board, and over social media sites.

20. A simulator for skill-oriented training of a task, the simulator comprising:
a work piece platform having at least one platform sensor;
a head-mounted display unit (HMDU) wearable by an operator operating the simulator, the HMDU having at least one camera, at least one speaker and at least one HMDU sensor, the at least one camera and the at least one speaker providing visual and audio output to the operator;
a controller operable by the operator, the controller having at least one controller sensor, the at least one controller sensor, the at least one HMDU sensor, and the at least one platform sensor each cooperating to measure and to output one or more signals representing spatial positioning, angular orientation and movement data of the controller relative to a work piece rendered on the work piece platform during one or more passes of a powder coating spray process, the work piece rendered as at least one of an electrically charged or grounded work piece;
a data processing system coupled to the work piece platform, the HMDU, and the controller, the data processing system including a processor and memory operatively coupled to the processor, the processor configured by a plurality of executable algorithms to:
determine coordinates of a position, an orientation, and a speed of movement of the controller in relation to the work piece rendered on the work piece platform during the one or more passes of the powder coating spray process based on the one or more signals from the at least one controller sensor, the at least one HMDU sensor and the at least one platform sensor;
model the powder coating spray process to determine a powder coating stream, charged particles, a path of travel of each of the charged particles due to attraction to the work piece, and a powder coating coverage applied on the work piece from the coordinates and speed of movement of the controller in relation to the work piece, wherein the path of travel of each of the charged particles is modeled based on at least one of a position, orientation, and speed of movement of the controller when the charged particle is emitted, and on one of simulated environmental conditions;
render the powder coating stream, the charged particles, the path of travel of each of the charged particles, the applied powder coating coverage, and sensory guidance as to the performance of the powder coating spray process by the operator in the training environment, in response to the modeled powder coating spray process; and
simulate in real-time a three-dimensional virtual training environment depicting the rendered work piece on the work piece platform, the rendered powder coating stream depicting the charged particles emitted from the controller along respective paths of travel, the rendered powder coating coverage depicting the applied powder coating coverage as the powder coating stream is applied to the work piece during one or more passes of the powder coating spray process performed by the operator in the training environment, and the rendered sensory guidance;
wherein the rendered powder coating stream, the rendered charged particles, the rendered path of travel of each of the charged particles, the rendered applied powder coating coverage, and the rendered sensory guidance are exhibited in near real-time to the operator within the training environment to provide in-process correction and reinforcement of preferred performance characteristics as the operator operates the controller.

21. The simulator of claim 20, wherein the rendered sensory guidance includes a plurality of visual, audio and tactile indications of performance by the operator operating the controller relative to the work piece rendered on the work piece platform as compared to optimal values for each position and orientation within the one or more passes of the powder coating spray process, the position and orientation components including a speed and direction of the one or more passes of the powder coating spray process and proximity of the controller relative to the work piece.

22. The simulator of claim 20, wherein the simulated environmental conditions include one of strength, resistance and position of an electrostatic field about the work piece.

23. The simulator of claim 3, wherein the plurality of simulated environmental conditions includes at least one of strength, resistance and position of the electrostatic field about the rendered work piece.

24. The simulator of claim 1, wherein the rendered work piece is simulated to move past the work piece platform.

25. The simulator of claim 1, wherein the rendered powder coating stream, the rendered charged particles, the rendered path of travel of each of the charged particles and the rendered applied powder coating coverage is affected by a Faraday Cage Effect.

* * * * *